US012542369B2

(12) United States Patent
Qiu et al.

(10) Patent No.: US 12,542,369 B2
(45) Date of Patent: Feb. 3, 2026

(54) ACOUSTIC SENSING AND COMMUNICATION USING A METASURFACE

(71) Applicant: Microsoft Technology Licensing, LLC, Redmond, WA (US)

(72) Inventors: Lili Qiu, Shanghai (CN); Yongzhao Zhang, Chengdu (CN); Yezhou Wang, Shanghai (CN); Yi-Chao Chen, Shanghai (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 144 days.

(21) Appl. No.: 18/608,487

(22) Filed: Mar. 18, 2024

(65) Prior Publication Data

US 2024/0321257 A1 Sep. 26, 2024

Related U.S. Application Data

(60) Provisional application No. 63/453,057, filed on Mar. 17, 2023.

(51) Int. Cl.
*H01Q 15/00* (2006.01)
*B82Y 15/00* (2011.01)
(Continued)

(52) U.S. Cl.
CPC .......... *H01Q 15/0086* (2013.01); *B82Y 15/00* (2013.01); *G10K 11/36* (2013.01);
(Continued)

(58) Field of Classification Search
CPC ........ H01Q 15/0086; H01Q 1/38; H01Q 3/46; H01Q 21/065; H01Q 5/40; H01Q 15/10;
(Continued)

(56) References Cited

U.S. PATENT DOCUMENTS

2020/0021034 A1 1/2020 Ko
2020/0304090 A1* 9/2020 Urzhumov ............... H01Q 3/26
(Continued)

FOREIGN PATENT DOCUMENTS

CN 107016989 A 8/2017
CN 107863097 A * 3/2018 ............. G10K 11/30
(Continued)

OTHER PUBLICATIONS

"Ansys HFSS Best-In-Class 3D High Frequency Electromagnetic Simulation Software", Retrieved From: https://web.archive.org/web/20220816090932/https:/www.ansys.com/products/electronics/ansys-hfss, Jul. 2022, 6 Pages.
(Continued)

*Primary Examiner* — Daniel Pihulic
(74) *Attorney, Agent, or Firm* — Holzer Patel Drennan

(57) ABSTRACT

A system executes a search to tune dimensions and distribution of meta-atoms in the passive acoustic metasurface with respect to a plurality of predefined input signal property sets of the acoustic signal to provide a tuned propagation profile of the meta-atoms in aggregate and forms the meta-atoms with the dimensions and the distribution. Each meta-atom modulates incoming acoustic wavefronts to form corresponding outgoing acoustic wave exiting the passive acoustic metasurface. The tuned propagation profile in aggregate supports the plurality of predefined input signal property sets of the incoming acoustic wavefronts and, for each input signal property set. The physical dimensions and the distribution of the meta-atoms are tuned according to the tuned propagation profile to modulate the incoming acoustic wavefronts to generate a predefined beam pattern of the acoustic signal exiting the passive acoustic metasurface corresponding to a select input signal property set of predefined input signal property sets.

20 Claims, 16 Drawing Sheets

(51) Int. Cl.
*G10K 11/36* (2006.01)
*H01Q 1/38* (2006.01)
*H01Q 3/46* (2006.01)
*H01Q 21/06* (2006.01)

(52) U.S. Cl.
CPC ................ *H01Q 1/38* (2013.01); *H01Q 3/46* (2013.01); *H01Q 21/065* (2013.01)

(58) Field of Classification Search
CPC .. H01Q 19/062; H01Q 25/007; H01Q 3/2658; B82Y 15/00; G10K 11/36; G10K 11/26
See application file for complete search history.

(56) References Cited

U.S. PATENT DOCUMENTS

| | | | | |
|---|---|---|---|---|
| 2021/0184351 | A1 | 6/2021 | Eleftheriades | |
| 2021/0195332 | A1* | 6/2021 | Subramanian | H04R 1/025 |
| 2022/0006511 | A1 | 1/2022 | Esfahlani et al. | |
| 2022/0180853 | A1* | 6/2022 | Memoli | G10K 11/26 |
| 2024/0313414 | A1* | 9/2024 | Pan | H01Q 25/007 |
| 2024/0321257 | A1* | 9/2024 | Qiu | G10K 11/26 |

FOREIGN PATENT DOCUMENTS

| | | | | | |
|---|---|---|---|---|---|
| CN | 112636001 | A | | 4/2021 | |
| CN | 114879233 | A | | 8/2022 | |
| CN | 114913841 | A | | 8/2022 | |
| CN | 116524893 | A | * | 8/2023 | G10K 11/36 |
| CN | 117807774 | A | * | 4/2024 | G06F 30/20 |
| GB | 2599256 | A | * | 3/2022 | G10K 11/30 |
| WO | 2022094686 | A1 | | 5/2022 | |
| WO | 2022169448 | A1 | | 8/2022 | |
| WO | WO-2024196856 | A1 | * | 9/2024 | G10K 11/36 |
| WO | WO-2024196866 | A1 | * | 9/2024 | G10K 11/36 |

OTHER PUBLICATIONS

"APMS-ULN Models—Multi-Channel Signal Generator up to 40 GHZ", Retrieved from: https://web.archive.org/web/20220520203229/https:/www.anapico.com/products/rf-signal-generators/multi-channel-analog-and-digital-signal-generator/apms-models-multi-channel-signal-generators-up-to-40-ghz/, May 20, 2022, 6 Pages.

"AWS Ground Station", Retrieved From: https://aws.amazon.com/ground-station/, Nov. 7, 2022, 9 Pages.

"Federal Communications Commission", Retrieved from: https://docs.fcc.gov/public/attachments/FCC-20-102A1.pdf, Jul. 30, 2020, 24 Pages.

"Genetic Algorithm", Retrieved From: https://web.archive.org/web/20220831214030/https:/www.mathworks.com/help/gads/what-is-the-genetic-algorithm.html, Aug. 31, 2022, 2 Pages.

"LEO Azimuth Tracking!", Retrieved From: https://web.archive.org/web/20220210012022/http:/aprs.org/LEO-tracking.html, Feb. 10, 2020, 2 Pages.

"Maxintalratio combining", Retrieved from: https://en.wikipedia.org/w/index.php?title=Maximal-ratio_combining&oldid=1114023182, Dec. 8, 2022, 1 Pages.

"Phoenix CubeSat", Retrieved from: http://phxcubesat.asu.edu/, Nov. 2, 2019, 9 Pages.

Qin, et al. "Realization of an Ultra-Thin Metasurface to Facilitate Wide Bandwidth, Wide Angle Beam Scanning", In Journal of Scientific Reports, vol. 8, Issue 1, Mar. 19, 2018, 11 Pages.

"SatNOGS", Retrieved from : https://web.archive.org/web/20221205043852/https:/satnogs.org/, Dec. 5, 2022, 2 Pages.

"Statista", Retrieved from: https://www.statista.com/statistics/617136/digital-population-worldwide/, Sep. 20, 2022, 3 Pages.

Arun, et al., "RFocus: Beamforming Using Thousands of Passive Antennas", In Proceedings of 17th USENIX Symposium on Networked Systems Design and Implementation, Feb. 25, 2020, pp. 1047-1061.

Chen, et al., "Pushing the Physical Limits of IoT Devices with Programmable Metasurfaces", In Proceedings of 18th USENIX Symposium on Networked Systems Design and Implementation, Apr. 12, 2021, pp. 425-438.

Cho, et al., "mmWall: A Reconfigurable Metamaterial Surface for Mmwave Networks", In Proceedings of the 22nd International Workshop on Mobile Computing Systems and Applications, Feb. 24, 2021, pp. 118-124.

Cho, et al., "Towards Dual-band Reconfigurable Metamaterial Surfaces for Satellite Networking", In Repository of arXiv:2206.14939v1, Jun. 29, 2022, 9 Pages.

Coffey, Joseph, "Latency in Optical Fiber Systems", In White Paper of Commscope, Oct. 24, 2022, 7 Pages.

Feng, et al., "A Wideband Antenna Using Metasurface for the 2g/3g/lte/5g Communications", In Journal of Microwave and Optical Technology Letters, vol. 60, Issue 10, Oct. 2018, pp. 2484-2487.

Francis, Allen, "1 in 3 People Around the World have Never used the Internet, a u.n. Report Estimates", Retrieved From: https://www.washingtonpost.com/world/2021/12/01/global-internet-usage/, Dec. 1, 2021, 2 Pages.

Giannoni, et al., "The Fermat Principle in General Relativity and Applications", In Journal of Mathematical Physics, vol. 43, Issue 1, Jun. 25, 1999, 42 Pages.

Huang, et al., "Reconfigurable Metasurface for Multifunctional Control of Electromagnetic Waves", In Journal of Advanced Optical Materials, vol. 5, Issue 22, Nov. 5, 2017, 6 Pages.

Handley, et al., "Delay is Not an Option: Low Latency Routing in Space", In Proceedings of the 17th ACM Workshop on Hot Topics in Networks, Nov. 15, 2018, 7 Pages.

Hosseininejad, et al., "Digital Metasurface Based on Graphene: An Application to Beam Steering in Terahertz Plasmonic Antennas", In Proceedings of IEEE Transactions on Nanotechnology, Jun. 25, 2019, pp. 734-746.

Hu, et al., "Reconfigurable Intelligent Surface Based RF Sensing: Design, Optimization, and Implementation", In Proceedings of IEEE Journal on Selected Areas in Communications, vol. 38, Issue 11, Jul. 3, 2020, pp. 2700-2716.

Hynes, Cara., "SpaceX Starlink Internet Review 2022: Should You Get It?", Retrieved from: https://www.satelliteinternet.com/providers/starlink/#Internet_fees, Nov. 21, 2022, 23 Pages.

Korte, et al., "Combinatorial Optimization", In Publication of Springer, 2011, 701 Pages.

Lai, et al., "Cooperatively Constructing Cost-Effective Content Distribution Networks upon Emerging Low Earth Orbit Satellites and Clouds", In Proceedings of IEEE 29th International Conference on Network Protocols, Nov. 1, 2021, 12 Pages.

Lai, et al., "OrbitCast: Exploiting Mega-Constellations for Low-Latency Earth Observation", In Proceedings of IEEE 29th International Conference on Network Protocols, Nov. 1, 2021, 12 Pages.

Lima, et al., "Circular Polarization Wide-Angle Beam Steering at Ka-Band by in-Plane Translation of a Plate Lens Antenna", In Journal of IEEE Transactions on Antennas and Propagation, vol. 63, Issue 12, Oct. 1, 2015, pp. 5443-5455.

Ma, et al., "Dual-Band Light Focusing Using Stacked Graphene Metasurfaces", In Journal of ACS Photonics, vol. 4, Issue 7, Jul. 19, 2017, pp. 1770-1775.

Malfajani, et al., "Design and Implementation of a Dual-Band Single Layer Reflectarray in X and K Bands", In Journal of IEEE Transactions on Antennas and Propagation vol. 62, Issue 8, May 29, 2014, pp. 4425-4431.

Mcwhirter, et al., "An EVD Algorithm for Para-Hermitian Polynomial Matrices", In Journal of IEEE Transactions on Signal Processing vol. 55, Issue 5, Apr. 23, 2007, pp. 2158-2169.

Qu, et al., "Single-Layer Dual-Band Reflectarray with Single Linear Polarization", In Journal of IEEE Transactions on Antennas and Propagation vol. 62, Issue 1, Oct. 28, 2013, pp. 199-205.

Quian, et al., "MilliMirror: 3D Printed Reflecting Surface for Millimeter-Wave Coverage Expansion", In Proceedings of the 28th Annual International Conference on Mobile Computing and Networking, Oct. 14, 2022, pp. 15-28.

Saifullah, et al., "Dual-Band Multi-Bit Programmable Reflective Metasurface Unit Cell: Design and Experiment", In Journal of Optics Express, vol. 29, Issue 2, Jan. 18, 2021, pp. 2658-2668.

(56) References Cited

OTHER PUBLICATIONS

Santos, et al., "Development of a Low-Cost Ground Segment Capable of Receiving Data from Nanosatellites: A Partnership Between Brazil and Portugal", In Proceedings of 4th Symposium on Space Educational Activities, Apr. 29, 2022, 6 Pages.
Singh, et al., "A Community-Driven Approach to Democratize Access to Satellite Ground Stations", In Journal of GetMobile: Mobile Computing and Communications, vol. 26, Issue 1, May 27, 2022, 14 Pages.
Tan, et al., "Enabling Indoor Mobile Millimeter-wave Networks Based on Smart Reflect-arrays", In Proceedings of IEEE Conference on Computer Communications, Apr. 16, 2018, pp. 270-278.
Tang, et al., "MIMO Transmission Through Reconfigurable Intelligent Surface: System Design, Analysis, and Implementation", In IEEE Journal on Selected Areas in Communications vol. 38, Issue 11, Jul. 3, 2020, pp. 2683-2699.
Vasisht, et al., "L2D2: Low Latency Distributed Downlink for Low Earth Orbit Satellites", In Proceedings of the 2021 ACM SIGCOMM 2021 Conference, Aug. 9, 2021, pp. 151-164.
Wang, et al., "Optically Reconfigurable Metasurfaces and Photonic Devices Based on Phase Change Materials", In Journal of Nature photonics, vol. 10, Issue 1, Jan. 10, 2011, pp. 60-65.
Ye, et al., "Nonterrestrial Communications Assisted by Reconfigurable Intelligent Surfaces", In Proceedings of IEEE, vol. 110, Issue 9, May 11, 2022, pp. 1423-1465.
Zelaya, "Lava: Fine-Grained 3D Indoor Wireless Coverage for Small IoT Devices", In Proceedings of the ACM SIGCOMM 2021 Conference, Aug. 9, 2021, pp. 123-136.
Zhang, et al., "Ultrathin Dual-Mode Vortex Beam Generator Based on Anisotropic Coding Metasurface", In Journal of Scientific Reports, vol. 11, Issue 1, Mar. 11, 2021, 8 Pages.
Zheng, et al., "Intelligent Reflecting Surface-Aided LEO Satellite Communication: Cooperative Passive Beamforming and Distributed Channel Estimation", In IEEE Journal on Selected Areas in Communications, vol. 40, Issue 10, Aug. 3, 2022, pp. 3057-3070.
Han, et al., "Dual-Band Metasurface for Broadband Asymmetric Transmission with High Efficiency", In Journal of Applied Physics, vol. 130, Issue 3, Jul. 21, 2021, 8 Pages.
Foo, et al., "Metamaterial-based Transmitarray for orthogonal-beam-space massive-MIMO," In 2016 10th European Conference on Antennas and Propagation (EuCAP), Apr. 10, 2016, 5 pages.
International Search Report and Written Opinion received for PCT Application No. PCT/US2024/020407, Jul. 9, 2024, 18 pages.
International Search Report and Written Opinion received for PCT Application No. PCT/US2024/20394, Jun. 21, 2024, 16 pages.
Pham, et al., "Dual-band transmitarrays with dual-linear polarization at Ka-band," IEEE Transactions on Antennas and Propagation, vol. 65, Issue No. 12, Dec. 2017, pp. 7009-7018.
International Preliminary Report on Patentability (Chapter 1) received for PCT Application No. PCT/US2024/020394, mailed on Oct. 2, 2025, 10 pages.
International Preliminary Report on Patentability (Chapter I) received for PCT Application No. PCT/US2024/020407, mailed on Oct. 2, 2025, 12 pages.
Non-Final Office Action mailed on Oct. 1, 2025, in U.S. Appl. No. 18/608,421, 15 pages.

* cited by examiner

800

(a) Magnitude of codebook.

(b) Phase of codebook.

(a) Phase distribution.

(b) Cell index.

ACOUSTIC SENSING AND COMMUNICATION USING A METASURFACE

CROSS-REFERENCE TO RELATED APPLICATIONS

The present application claims priority to U.S. Provisional Patent No. 63/453,057, entitled "Adaptive Metasurface for Low Earth Orbit Satellite Communications and Acoustic Sensing and Communication" and filed on Mar. 17, 2023, which is specifically incorporated by reference for all that it discloses and teaches.

The present application is related to U.S. patent application Ser. No. 18/608,421, entitled "Passive Metasurface for Interacting with Electromagnetic Signals," which is filed concurrently herewith and is specifically incorporated by reference for all that it discloses and teaches.

BACKGROUND

Acoustic sensing and communication are becoming increasingly popular due to widely available devices that support such technologies, including smartphones, smart speakers, and many Internet of Things (IoT) devices. For example, such technologies may be employed to develop smartphone-based approaches that transmit inaudible acoustic signals to track a target's distance, position, and movement, to enable more accurate sensing by exploiting a microphone array on a smart speaker, to develop acoustic communication systems as an NFC alternative, to design underwater messaging systems using acoustic signals since acoustic signals attenuate slower than RF signals. Despite significant advances in acoustic sensing, there is a fundamental limit on its sensing range and resolution, as shown in the Cramer-Rao bound, which indicates the sensing resolution is constrained by signal-to-noise-ratio (SNR) limits in existing technologies and the number of transmitters and receivers required in existing solutions. Similarly, acoustic communication also faces similar challenges according to the Shannon capacity.

SUMMARY

In some aspects, the techniques described herein relate to a method of designing a passive acoustic metasurface for interacting with an acoustic signal received at the passive acoustic metasurface from an acoustic transmitter, the method including: executing a search to tune physical dimensions and distribution of meta-atoms in the passive acoustic metasurface with respect to a plurality of predefined input signal property sets of the acoustic signal to provide a tuned propagation profile of the meta-atoms in aggregate; and forming the meta-atoms with the physical dimensions and the distribution determined by the search over the passive acoustic metasurface, wherein each meta-atom is configured to modulate incoming acoustic wavefronts to form corresponding outgoing acoustic wave exiting the passive acoustic metasurface, wherein the tuned propagation profile in aggregate supports the plurality of predefined input signal property sets of the incoming acoustic wavefronts and, for each input signal property set, the physical dimensions and the distribution of the meta-atoms are tuned according to the tuned propagation profile to modulate the incoming acoustic wavefronts to generate a predefined beam pattern of the acoustic signal exiting the passive acoustic metasurface corresponding to a select input signal property set of the plurality of predefined input signal property sets.

In some aspects, the techniques described herein relate to a passive acoustic metasurface system for interacting with an acoustic signal received at the passive acoustic metasurface system from an acoustic transmitter, the passive acoustic metasurface system including: a passive acoustic metasurface designed by executing a search to tune physical dimensions and distribution of meta-atoms in the passive acoustic metasurface with respect to a plurality of predefined input signal property sets of the acoustic signal to provide a tuned propagation profile of the meta-atoms in aggregate, and manufactured by forming the meta-atoms with the physical dimensions and the distribution determined by the search over the passive acoustic metasurface, wherein each meta-atom is configured to modulate incoming acoustic wavefronts to form corresponding outgoing acoustic wave exiting the passive acoustic metasurface, wherein the tuned propagation profile in aggregate supports the plurality of predefined input signal property sets of the incoming acoustic wavefronts and, for each input signal property set, the physical dimensions and the distribution of the meta-atoms are tuned according to the tuned propagation profile to modulate the incoming acoustic wavefronts to generate a predefined beam pattern of the acoustic signal exiting the passive acoustic metasurface corresponding to a select input signal property set plurality of predefined input signal property sets.

In some aspects, the techniques described herein relate to one or more tangible processor-readable storage media embodied with instructions for executing on one or more processors and circuits of a computing device a process for designing a passive acoustic metasurface for interacting with an acoustic signal received at the passive acoustic metasurface from an acoustic transmitter, the process including: executing a search to tune physical dimensions and distribution of meta-atoms in the passive acoustic metasurface with respect to a plurality of predefined input signal property sets of the acoustic signal to provide a tuned propagation profile of the meta-atoms in aggregate; wherein the meta-atoms of the passive acoustic metasurface are formed with the physical dimensions and the distribution determined by the search over the passive acoustic metasurface, wherein each meta-atom is configured to modulate incoming acoustic wavefronts to form corresponding outgoing acoustic wave exiting the passive acoustic metasurface, wherein the tuned propagation profile in aggregate supports the plurality of predefined input signal property sets of the incoming acoustic wavefronts and, for each input signal property set, the physical dimensions and the distribution of the meta-atoms are tuned according to the tuned propagation profile to modulate the incoming acoustic wavefronts to generate a predefined beam pattern of the acoustic signal exiting the passive acoustic metasurface corresponding to a select input signal property set plurality of predefined input signal property sets.

In some aspects, the techniques described herein relate to a passive acoustic metasurface for interacting with an acoustic signal received at the passive acoustic metasurface, the passive acoustic metasurface including: a matrix of meta-atoms distributed throughout the passive acoustic metasurface, each meta-atom being positioned in the passive acoustic metasurface to provide a tuned propagation profile of the meta-atoms in aggregate, each meta-atom providing a propagation path for at least a beam of the acoustic signal, each meta-atom interacting with the acoustic signal to modulate incoming acoustic wavefronts of the acoustic signal received by the meta-atom to form corresponding outgoing acoustic wavefronts of the acoustic signal exiting the passive acoustic metasurface, wherein the tuned propagation profile of the meta-atoms in aggregate supports a plurality of predefined input signal property sets of the incoming acoustic wavefronts and, for each input signal property set, physical dimensions and distribution of the meta-atoms in the passive acoustic metasurface are tuned according to the tuned propagation profile to phase shift the incoming acoustic wavefronts to generate a predefined beam pattern of the acoustic signal exiting the passive acoustic metasurface corresponding to the input signal property set.

In some aspects, the techniques described herein relate to a method of manufacturing a passive acoustic metasurface for interacting with an acoustic signal received at the passive acoustic metasurface, the method including: executing search to tune a beamforming weight and position of each meta-atom of a plurality of meta-atoms with respect to a steering vector corresponding to an incident angle of a beam of the acoustic signal; and forming a matrix of the meta-atoms distributed throughout the passive acoustic metasurface, each meta-atom being positioned in the passive acoustic metasurface to provide a tuned propagation profile of the meta-atoms in aggregate, each meta-atom providing a propagation path for at least a beam of the acoustic signal, each meta-atom interacting with the acoustic signal to modulate incoming acoustic wavefronts of the acoustic signal received by the meta-atom to form corresponding outgoing acoustic wavefronts of the acoustic signal exiting the passive acoustic metasurface, wherein the tuned propagation profile of the meta-atoms in aggregate supports a plurality of predefined input signal property sets of the incoming acoustic wavefronts and, for each input signal property set, physical dimensions and distribution of the meta-atoms in the passive acoustic metasurface are tuned according to the tuned propagation profile to phase shift the incoming acoustic wavefronts to generate a predefined beam pattern of the acoustic signal exiting the passive acoustic metasurface corresponding to the input signal property set.

In some aspects, the techniques described herein relate to a method of using a passive acoustic metasurface for interacting with an acoustic signal received at the passive acoustic metasurface, the method including: modifying at least one input property of the acoustic signal among a plurality of predefined input property sets, wherein the passive acoustic metasurface is formed as a matrix of meta-atoms distributed throughout the passive acoustic metasurface, each meta-atom being positioned in the passive acoustic metasurface to provide a tuned propagation profile of the meta-atoms in aggregate, each meta-atom providing a propagation path for at least a beam of the acoustic signal; and steering the acoustic signal exiting the passive acoustic metasurface each meta-atom modulating incoming acoustic wavefronts of the acoustic signal received by the meta-atom to form corresponding outgoing acoustic wavefronts of the acoustic signal exiting the passive acoustic metasurface, wherein the tuned propagation profile of the meta-atoms in aggregate supports the plurality of predefined input signal property sets of the incoming acoustic wavefronts and, for each input signal property set, physical dimensions and distribution of the meta-atoms in the passive acoustic metasurface are tuned according to the tuned propagation profile to phase shift the incoming acoustic wavefronts to generate a predefined beam pattern of the acoustic signal exiting the passive acoustic metasurface corresponding to the input signal property set.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Other implementations are also described and recited herein.

DETAILED DESCRIPTION

Figure 1:
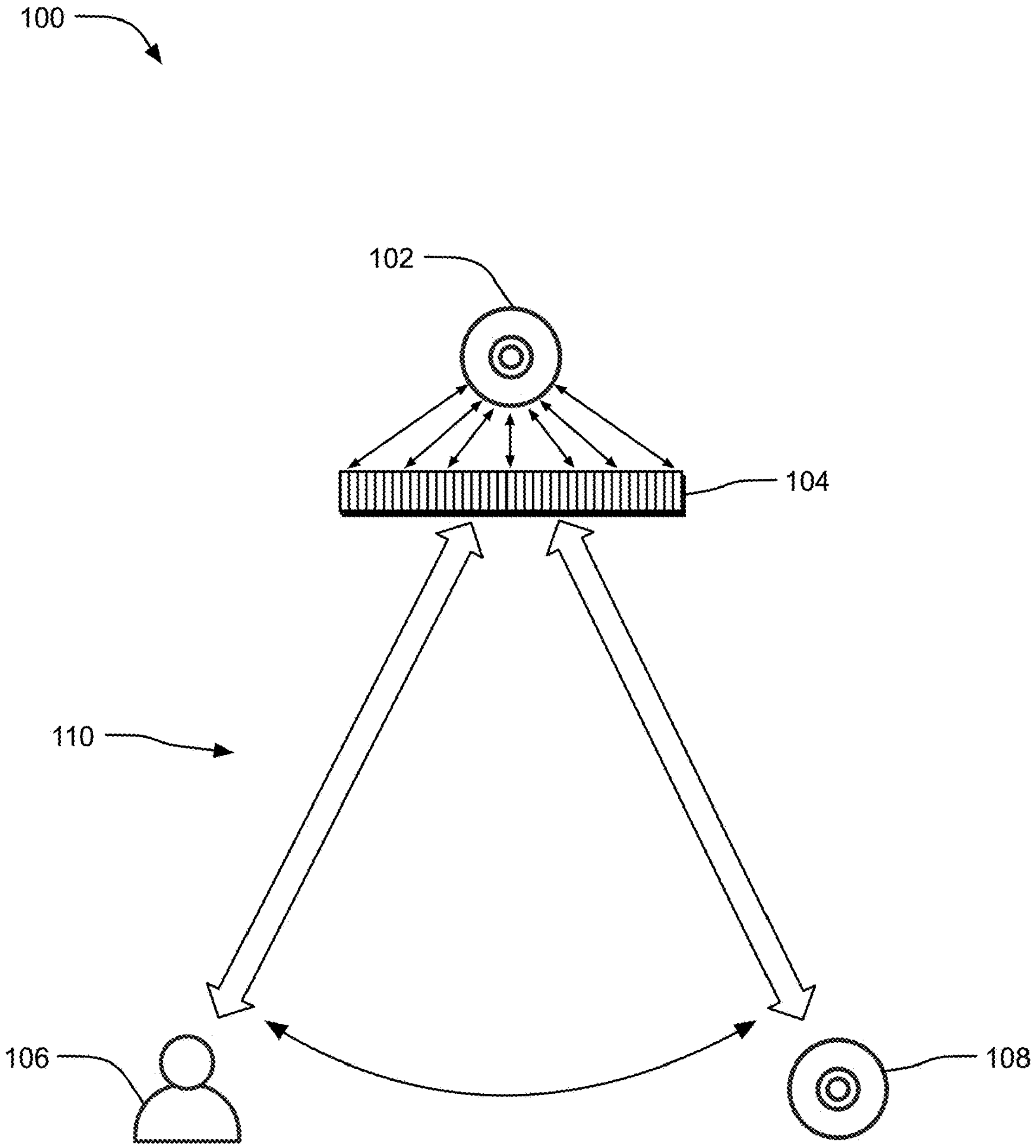
FIG. 1 illustrates an example environment for acoustic sensing and communication.

Acoustic sensing and communication are increasingly popular owing to widely available devices that support them, such as smartphones, smart speakers, and other acoustic systems. Yet the sensing resolution and range are still limited due to limited bandwidth and sharp decay in the signal at inaudible frequencies. The described technology applies passive acoustic metasurfaces to acoustic sensing and communication solutions. The described passive acoustic metasurface technology can achieve a significant SNR increase while maintaining a compact size over existing technologies.

Furthermore, a major limitation of passive acoustic metasurface technology is its static configuration and operation. Targets of an acoustic sensing and/or communication system may be positioned at any possible location and may indeed be in motion within the environment. Hence, an objective is to support scanning in different directions to track with the targets within a supported range of angles. To address this and other objectives, the described technology provides a passive acoustic metasurface that has been designed by jointly optimizing the structural configuration of the passive acoustic metasurface and selective control of transmission signals from corresponding speakers/microphones to achieve low-cost dynamic steering from the passive acoustic metasurface. As a result, the described technology can demonstrate effectiveness in improving SNR, acoustic sensing accuracy, and acoustic communication reliability over a wide range of scenarios.

In order to improve the performance further, one could increase the number of acoustic transceivers. However, increasing the number of transceivers increases the cost, size, and energy consumption. In addition, existing sound cards cannot support more than eight channels. All of these factors significantly limit the applicability of increasing the number of transceivers in a real-world deployment.

Another option is to adopt an acoustic lens. Like optical lenses, acoustic lenses can steer the direction of acoustic wave propagation and focus in a certain region. However, an acoustic lens is usually bulky due to the large wavelength of acoustic waves. In comparison, an acoustic metasurface provides a more compact design.

An acoustic metasurface can include many sub-wavelength cells, where each cell can act like a mini-transducer and modify the phase and/or intensity of the incident wave so that collectively, the passive acoustic metasurface can manipulate the wave in an interesting way (e.g., steer the outgoing wave toward a certain direction).

In one implementation disclosed herein, a passive acoustic metasurface with a beamforming configuration may be used in conjunction with one or more speakers or microphones (collectively, "transceivers"). In one example, beamforming with a passive acoustic metasurface using 3 and 6 speakers can increase SNR by 4.7 dB and 7.9 dB, respectively. In comparison, another example passive acoustic metasurface of size 16×16 cells under 1 speaker can increase SNR by 15.5 dB. As such, a passive acoustic metasurface can significantly increase the SNR using a compact design without consuming power.

While a passive acoustic metasurface is an alternative to dynamic acoustic metasurfaces, typical passive acoustic metasurfaces may support only static configuration and operation, e.g., always beamform towards a fixed angle. Since the target can be at any location, a beamform as a fixed angle will not track a moving target or cannot be adjusted to impinge a target that is outside of the fixed angle. Simply moving (e.g., rotating or translating) the passive acoustic metasurface in an effort to mimic a dynamic beam is not always a practical option. Instead, the described technology employs dynamic beam steering with a passive acoustic metasurface by selectively modifying input properties of an incoming signal, such as by using a phased array, to change the angle of the outgoing beam or modifying the receiver processing at multiple microphones.

FIG. 1 illustrates an example environment 100 for acoustic sensing and communication. An acoustic transceiver system 102 (e.g., a smart speaker) is positioned in the environment 100. In one implementation, the acoustic transceiver system 102 includes a phased array of speakers and/or a phased array of microphones. In order to enhance the signal-to-noise ratio (SNR) of outgoing and incoming acoustic signals, a passive acoustic metasurface 104 has been placed between the acoustic transceiver system 102 and a sensing target 106 (e.g., a person) and between the acoustic transceiver system 102 and a communication node 108 (e.g., another smart speaker). The acoustic transceiver system 102 is referred to herein as a "source" and/or "receiver." The sensing target 106 and the communication node 108 are collectively referred to as "targets," although both targets may originate, reflect, or receive acoustic signals. Incident acoustic waves can be propagated by (e.g., transmitted through or reflected from) the passive acoustic metasurface 104 in either direction and from either side of the passive acoustic metasurface 104 or round-trip to and from the target.

Because the targets can be positioned at different locations (e.g., at different angles) and may even move relative to the acoustic transceiver system 102 and the passive acoustic metasurface 104, the angle of acoustic beams 110 between the source and the targets is adjustable. For example, as the sensing target 106 moves across a room containing the acoustic transceiver system 102 and the passive acoustic metasurface 104, the acoustic beams are dynamically steerable to track with the movement of the sensing target 106, despite the fact that the passive acoustic metasurface 104 is expressly a passive structure, as opposed to a dynamic metasurface that can be actively tuned or reconfigured, such as by applying an adjustable voltage to electromagnets attached to the dynamic metasurface membrane to modify the phase and/or intensity of incident acoustic waves.

Figure 2:
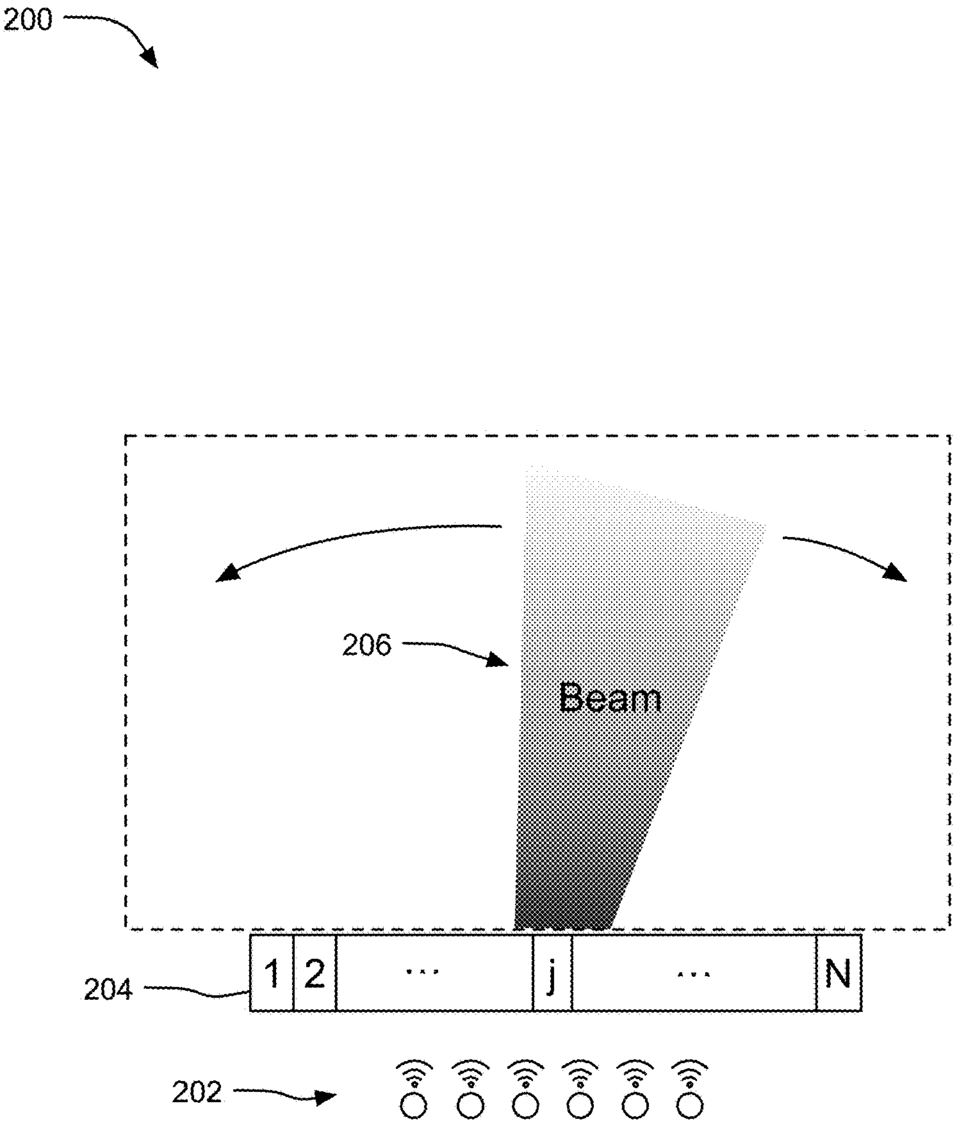
FIG. 2 illustrates an example dynamic acoustic beam steering system with a speaker phased array and a passive acoustic metasurface.

FIG. 2 illustrates an example dynamic acoustic beam steering system 200 with a speaker phased array 202 and a passive acoustic metasurface 204. Referring to FIG. 2, for example, a passive acoustic metasurface 204 has many unit cells (also referred to as meta-atoms) labeled as 1–N (with j being the index) in FIG. 2, and each unit cell can be potentially treated as a mini-antenna. In this way, the passive acoustic metasurface 204 effectively increases the number of speakers (and/or the number of microphones), thereby improving sensing resolution. By controlling the phase and/or amplitude of acoustic wave propagation through each unit cell, the passive acoustic metasurface 204 can manipulate the wave fields. The illustrated example dynamic acoustic beam steering system 200 disclosed herein combines many sub-wavelength, pre-manufactured 3D unit cells into the passive acoustic metasurface 204. Each unit cell encodes a specific phase offset. By re-arranging these unit cells, one can produce many different instances of a metasurface. Since acoustic sensing/communication usually uses inaudible sounds with much smaller wavelengths to avoid disturbance, a coiling-up metasurface is more compact than a Helmholtz-resonator and a membrane-type structure.

The use of the passive acoustic metasurface 204 achieves a sharp beam with a small number of speakers, a large SNR gain, and high resolution. The use of beamforming, even using very few speakers, can enable dynamic steering without requiring movement of the passive acoustic metasurface 204 relative to the speaker phased array 202 and without requiring a dynamic metasurface membrane. A small number of speakers in a phased array with the passive acoustic metasurface 204 can achieve beamforming resolution similar to a large number of speakers. For example, using a passive acoustic metasurface with 16×16 cells and a 6-speaker phased array is comparable to a 9×16=144 phased array in terms of beam width.

In implementations of the described technology, a joint design algorithm may be executed to optimize the configuration of the passive acoustic metasurface 204 and the beamforming weights of the speaker phased array 202. Specifically, the joint design of the passive acoustic metasurface 204 and the configurable beamforming of the speaker phased array 202 can be formulated as an optimization problem having an objective to maximize or tune the acoustic signal strength along each of the desired angles of operation (e.g., sampled from a range of angles) and to minimize or tune the performance variance across these angles and energy in the side lobes.

The optimization of metasurface, speaker/microphone phased array processing and, optionally, their relative placements (e.g., placement relative to each other) increases the signal to noise ratio (SNR). According to the Cramer Rao's bound and Shannon capacity, the increased SNR leads to improved wireless sensing and communication performance.

In one implementation, the system of the example dynamic acoustic beam steering system 200 includes a 3D-printed membrane of the passive acoustic metasurface 204, six speakers in the speaker phased array 202, and a microphone. A joint design algorithm may be applied to determine an acoustic metasurface configuration and phased array codeword for dynamically steering the outgoing beam 206 in real time. The passive acoustic metasurface 204 and the speaker phased array 202 are jointly tuned to enable dynamic beam steering and high SNR for acoustic sensing and communication. The joint design can be evaluated using (i) SNR of the received signal, (ii) sensing performance (e.g., distance estimation using Frequency Modulated continuous Waves (FMCW) and angle estimation using the MUltiple SIgnal Classification (MUSIC) algorithm), and (iii) the communication error.

The example implementation of an acoustic sensing system described herein yields a significant improvement in SNR, distance estimation, angle estimation, and communication reliability. In particular, jointly designing a passive acoustic metasurface and codewords of a phased array allows dynamic steering of the beam to the desired direction and boosts SNR. The improved SNR, in turn, increases the acoustic sensing and communication ranges. The approach increases the sensing range from 1.5 m in a single speaker without an acoustic metasurface to 4 m using 6-speaker with a passive acoustic metasurface; similarly, it increases the communication range from 0.8 m to 3.9 m.

In the example implementation, a passive acoustic metasurface is transparent to sensing algorithms. Accordingly, one can apply the existing distance estimation (e.g., FMCW) or angle estimation algorithm (e.g., MUSIC) to the received signals at the transceivers.

As noted above, multiple transmitters and/or multiple receivers can be used to strengthen the received signals. At the transmitter (e.g., speaker) end, beamforming can be used to generate transmissions that arrive in phase at the receiver so that the multipath signals are added up constructively. At the receiver (e.g., microphone) end, the receiver can compensate for the phase difference of the received signals across different multipath signals to ensure constructive combining.

In various implementations, a passive acoustic metasurface is a 2D structure that consists of many sub-wavelength 3D unit cells. By carefully designing each of the unit cells, one can manipulate acoustic waves by dynamically altering one or more signal properties of an acoustic signal that interacts with the passive acoustic metasurface. Each unit cell can be viewed as a mini sound source. To perform beamforming in a certain direction, the paths going through different unit cells in the metasurface add together constructively to enhance the SNR in the direction/angle. This beamforming can be achieved by letting each unit cell compensate for the phase difference. For example, without special design, in the desired direction, the path going through a first unit cell differs from the second unit cell by $\phi_{1,2}$. To ensure the signals from these two paths add up constructively, one can design the first unit cell, and the second cell can be designed to compensate for phase difference $\phi_{1,2}$. One way to achieve this is to impose different geometric structures so that the path going through the second cell is $$\frac{\phi_{1,2}}{2\pi}$$

$\lambda$ longer than the path through the first cell.

Figure 3:
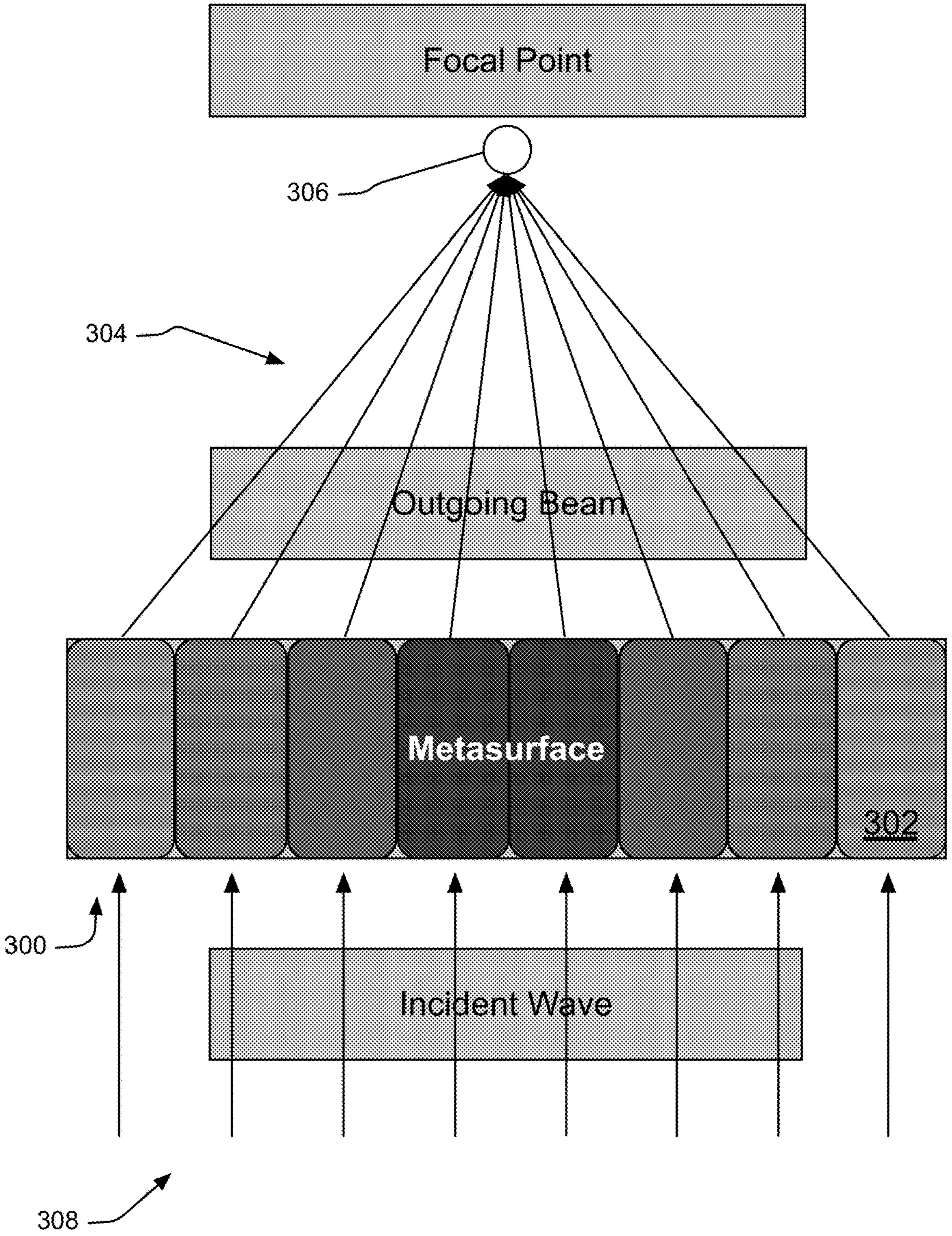
FIG. 3 illustrates an example passive acoustic metasurface consisting of multiple unit cells and beamforms toward a focal point.

FIG. 3 illustrates an example passive acoustic metasurface 300 consisting of multiple unit cells (see, e.g., unit cell 302) and beamforms 304 toward a focal point 306. An incident plane wave 308 is focused at the focal point 306 after passing through the passive acoustic metasurface 300. Due to the reciprocity principle, when a point source is placed at the focal point 306, the signal coming out of the passive acoustic metasurface 300 would be an outgoing plane wave directed in the direction that is typically orthogonal to the metasurface. However, the passive acoustic metasurface 300 has been jointly designed with the codewords of a phased array at the focal point 306 so as to allow dynamic steering of the incident plane wave 308 or outgoing plane wave in response to changes in a phased array at the focal point. In some implementations, such changes are attributed to different codewords that control the signal properties via a phased array, where a codeword represents a set of analog phase shift values or a set of magnitude plus phase shift values applied to the phased array.

Figure 4:
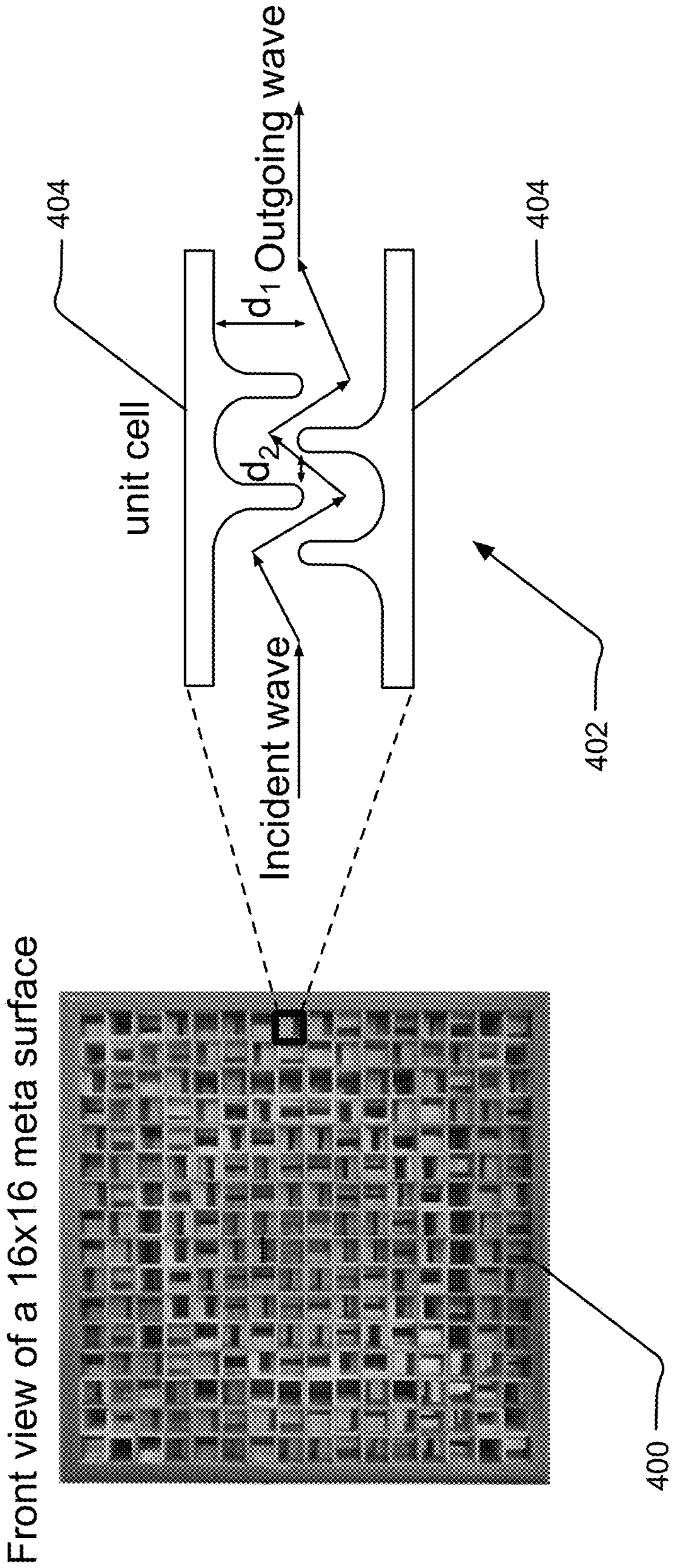
FIG. 4 illustrates an example passive acoustic metasurface and a side view of a unit cell characterized by the length parameters

FIG. 4 illustrates an example passive acoustic metasurface 400 and a side view of a unit cell 402 characterized by the length parameters $d_1$ and $d_2$. The passive acoustic metasurface 400 consists of 16×16 unit cells based on the described technology, each unit cell being formed from a substantially rigid material 404 (e.g., a thermoplastic material) and defining an acoustic wave propagation path through the unit cell (e.g., from one side of the passive acoustic metasurface 400 to the other through the unit cell). In FIG. 4, the propagation path through unit cell 402 is indicated by the arrowed line traversing from left to right from incident wave to outgoing wave.

Different lengths of the propagation paths induce different phase delays at the output. The structure and distribution of the unit cells across the passive acoustic metasurface 400 are characterized by a tuned propagation profile of the unit cell responses in aggregate (e.g., according to the internal structure of each unit cell and the distributions of the unit cells over the passive acoustic metasurface), such that phase shifts imposed on individual wavefronts at each unit cell result in directing the beam of the acoustic signal at one of multiple predefined steering angles. The selection of that steering angle is controlled by the input signal property of the incoming signal imposed by a codeword applied to the phased array, for example. Accordingly, by varying the signal properties of the incoming signal among a predefined set of input signal properties, the steering angle of the outgoing signal exiting the passive acoustic metasurface can be deterministically controlled—to change the steering angle, change the codeword that controls the signal properties of the incoming signal.

For purposes of this discussion, assume the incident sound wave enter a unit cell 402 from the left. The curved propagation path increases the time the incident sound wave takes to traverse through the unit cell 402, which essentially introduces a phase shift to the outgoing wave. The unit cell structures formed from the substantially rigid material 404 of different unit cells in the passive acoustic metasurface 400 form different propagation paths determined by two dominant parameters: $d_1$ and $d_2$, which result in different propagation path lengths and hence different phase delays. Parameter $d_1$ is shown as the length of a protrusion of rigid material from an interior wall of the unit cell 402 into the interior or the unit cell 402, and parameter $d_2$ is shown as a spacing along an axis through the unit cell between protrusions of rigid material. A single unit cell may include multiple instances of these parameters (e.g., the lengths of other protrusions and/or the distances between other protrusions). One way to determine $d_1$ and $d_2$ is through numerical methods in a simulator (e.g., COMSOL, which is a finite-element-based multiphysics simulator). It should be understood that the same concepts can be applied to signals traveling through or reflecting off the passive acoustic metasurface 400 to microphones in a phased array at the focal point based on the reciprocity principle. Other physical dimensions of each unit cell can also be determined during the joint design, including, without limitation, tunnel length (e.g., the axial length of the unit cell or the length of travel from the input of the unit cell to the output of the unit cell), protrusion thicknesses, the number of protrusions, etc.

A phase shift profile (also referred to as a tuned propagation profile to reflect that the profile can reflect changes in phase and/or amplitude of an acoustic signal interacting with each metasurface) is encoded into the metasurface by placing each unit cell (imposing the specifically-designed phase shift) at appropriate locations in the metasurface to provide a desired functionality. The design determines the individual phase shift corresponding to each propagation element of each unit cell distributed over the metasurface. The phase shift values applied to each unit cell determine the explicit physical dimensions associated with the propagation element of each unit cell.

A tuned (e.g., optimized) propagation profile can be implemented (e.g., based on joint design with the expected signal properties of the incoming acoustic signals and the expected positioning of acoustic signal receivers) by placing the unit cells at appropriate locations in the metasurface. Each unit cell is designed to provide a deliberately designed phase shift coverage in aggregate (with the other unit cells) to achieve high transmittance/reflectivity. The described technology can provide a specially designed phase shift profile in each propagation direction to achieve dynamic fine-grained focusing and steering using a combination of a passive metasurface and a small phased array. As such, the physical dimensions and the distribution of the propagation elements of the unit cells in the passive metasurface are structurally tuned according to the tuned propagation profile to modulate the incoming acoustic wavefronts to generate a defined beam pattern of the acoustic signal exiting the passive acoustic metasurface corresponding to the input signal property set.

Figure 5:
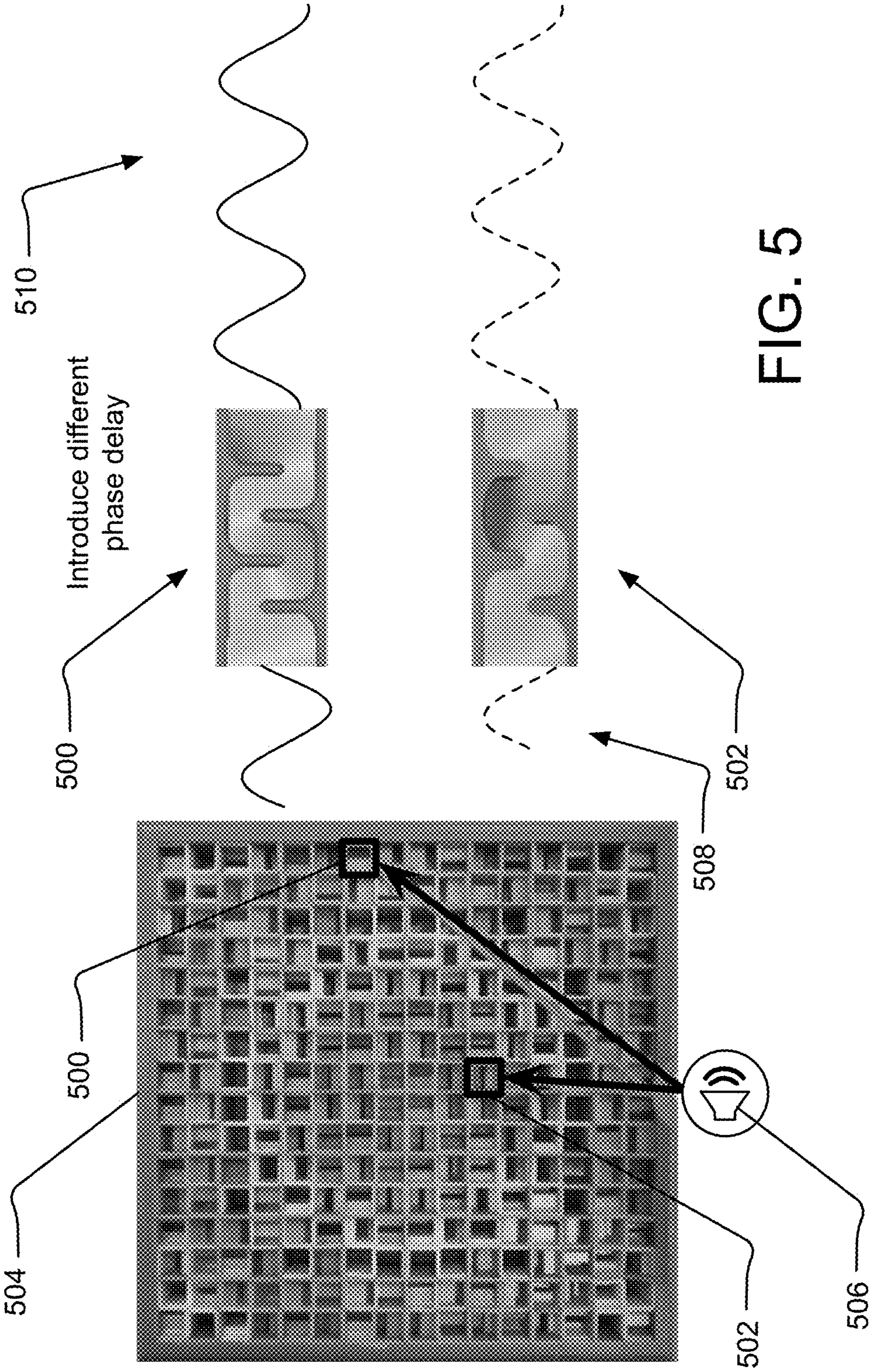
FIG. 5 illustrates example unit cells in a passive acoustic metasurface that consists of 16×16 unit cells based on the described technology.

FIG. 5 illustrates example unit cells (see, e.g., a unit cell 500 and a unit cell 502) in a passive acoustic metasurface 504 that consists of 16×16 unit cells based on the described technology. A phased speaker array 506 is positioned at a focal point before the passive acoustic metasurface 504. Incident waves 508 at the two different unit cells have different phases. However, each unit cell is structured in accordance with different dominant parameters $d_1$ and $d_2$ so that the outgoing waves 510 from each unit cell are in substantially the same phase (i.e., "in phase"). As such, the structure of each unit cell in the passive acoustic metasurface 504 is tuned to receive incident waves having different phases and to output outgoing waves that have the same phase.

Moreover, in the context of dynamically steering beams using the passive acoustic metasurface 504, the structure of each unit cell in the described technology is also jointly designed in cooperation with the signal properties (e.g., phase and/or magnitude) of the codewords of a phased array at the focal point (e.g., the position of the audio speaker). In this manner, changing the codeword of the phased array changes the signal properties of the incident waves 508, causing the beamforming to change the steering angle of the outgoing waves 510 relative to the orthogonal direction to the surface of the passive acoustic metasurface 504. In this manner, for example, the outgoing waves 510 are dynamically steered by the coordination of the varying signal properties of the incident waves 508 and the structure of the passive acoustic metasurface 504. It should be understood that the same concepts can be applied to signals traveling through or reflecting off the passive acoustic metasurface 504 to microphones in a phased array at the focal point based on the reciprocity principle.

As shown in FIG. 5, the unit cells have intricate maze-like internal structures, with four parallel bars positioned orthogonal to the direction of incoming sound waves. Interestingly, the transmission efficiency is high and reaches 98% on average across all unit cells. Generally, this response is due to at least the following two major reasons: i) the sub-wavelength cells produce diffraction and cause the energy of sound to bypass the parallel bars instead of being reflected back; and ii) the bars inside each unit cell are curved instead of having sharp angles to reduce acoustic impedance and maintain high transmission efficiency. Overall, the passive acoustic metasurface 504 has negligible power loss, so power loss need not be considered when developing a passive acoustic metasurface design for a narrow bandwidth, although for a wide bandwidth, power loss may be considered.

Figure 6:
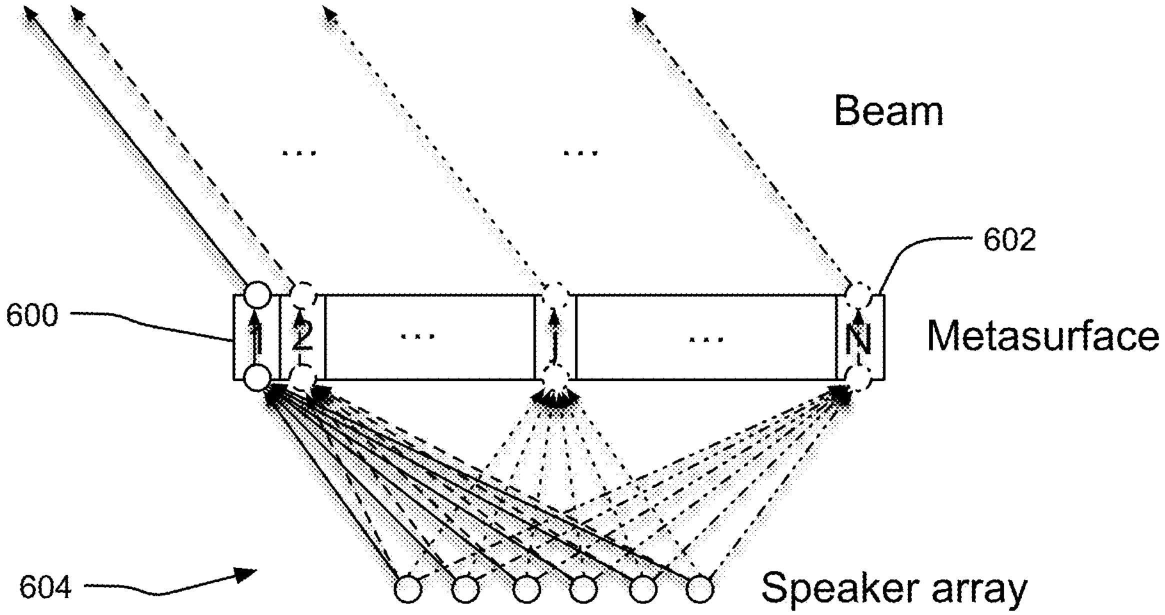
FIG. 6 illustrates an example passive acoustic metasurface composed of multiple unit cells and beamforms propagating to/from a focal point by proper configuration of the unit cells.

FIG. 6 illustrates an example passive acoustic metasurface 600 composed of multiple unit cells and beamforms propagating to/from a focal point by proper configuration of the unit cells. See, e.g., a unit cell 602. The unit cells can be arranged in a straight line to form a 1D metasurface or in a rectangle to form a 2D metasurface of 3D unit cells. By introducing an appropriate phase shift at each unit cell, beamforming can be achieved. The types of unit cells can be quantized, in one example, into 16 choices to make it easy to assemble/re-assemble a metasurface. The unit cells may cover the phase shift from 0 to $2\pi$. So, for each location in the array, a unit cell is chosen for the phase shift closest to the desired shift.

Once the passive acoustic metasurface 600 is printed, the mapping from the incoming wave to the outgoing wave is fixed. Since the target can be in any direction, varying codewords of a phased speaker array 604 are employed to steer the direction of the outgoing wave. Given the fixed configuration of the passive acoustic metasurface 600, one way to change the direction of the outgoing wave is to move the passive acoustic metasurface 600 either through translation movement or through rotation. While movement is feasible, mechanical movement is slow, consumes significant power, causes wear and tear, and may even require operator intervention. For practical use, it is desirable to dynamically adjust the direction of the wave coming out of the passive acoustic metasurface 600 by varying codewords of the phased speaker array 604 to avoid a need for mechanical movement. Thus, the passive acoustic metasurface 600 and phased speaker array 604 are jointly designed to realize the desired beamforming for different steering angles based on different codewords (which represent different beam phases and/or magnitudes). It should be understood that the same concepts can be applied to signals traveling through or reflecting off the passive acoustic metasurface 600 to microphones in a phased array at the focal point based on the reciprocity principle.

Phased arrays use beamforming to combine signals from multiple speakers constructively. Beamforming can be applied to either senders or receivers, or both. There are a number of beamforming algorithms. They vary in the optimization objectives: some maximize the signal, while others minimize interference. In analog beamforming, beamforming is performed on analog signals at the transmitter before sending to the air or at the receiver before the analog to digital conversion. In digital beamforming, beamforming is performed on digital signals at the transmitter before digital-to-analog conversion or at the receiver after analog-to-digital conversion.

The beamforming capability depends on the number of speakers and their separation. In one example, beam patterns are shown corresponding to a varying number of speakers m. The beam width in the desired direction is relatively large, and the sidelobes are significant when the number of speakers is within 8. The half-power beam width (HPBW) at 0° (i.e., perpendicular to the speaker array) can be approximated as follows:

$$\theta_{0.5} \approx \frac{0.886\,\lambda}{md},$$

where λ is the wavelength, m is the number of speakers, and d represents the speaker separation, which is usually recommended to be λ/2. For example, the HPBW will be 59.6°, 25.5°, 16.9°, and 6.3° when the number of speakers is 2, 4, 6, and 16, respectively. The beam width for a general angle can be derived as follows:

$$\theta_{0.5s} = \frac{\theta_{0.5}}{\cos\theta_s}$$

where $\theta_s$ is the steering angle and $\theta_{0.5s}$ is the HPBW of the steered beam. This indicates that the scanning range should not be too large, and usually $\theta_s \leq 60°$.

A passive acoustic metasurface is not reconfigurable on the fly once it is assembled (e.g., 3D printed or manufactured via another method). To provide dynamic adaptation while achieving high resolution and long range, a small number of speakers along with an acoustic metasurface are used. The beamforming of the speakers is optimized so that the outgoing wave from the passive acoustic metasurface is towards a desired angle. More specifically, a phased array can control the direction of the output signal, which serves as the incoming signal propagating toward the passive acoustic metasurface. The use of multiple speakers allows for the achievement of fast, dynamic control without the physical movement of components.

Returning to FIG. 2, there are M speakers. Let $w_i$ denote the codeword for the i-th speaker, where $w_i$ is a complex number in which the magnitude and phase are the scaling factor and phase shift for the i-th transmission signal, respectively. There are N unit cells in a passive acoustic metasurface. The acoustic signal received by the j-th passive acoustic metasurface unit cell from the i-th speaker $S_{i,j}$ can be computed as follows, where $t_i$ is the i-th speaker's transmission signal and $H_{ij}$ denotes the channel between the i-th speaker and j-th cell:

$$S_{i,j} = H_{ij} w_i t_i \tag{1}$$

Since the relative position between the passive acoustic metasurface uni cell j and the transmitter i is pre-determined, one can derive $$H_{i,j} = F(d_{i,j}) = a(d_{i,j}) e^{-j2\pi f \frac{d_{i,j}}{c}},$$

where c is the speed of the acoustic signal, $d_{i,j}$ is the distance from the i-th transmitter to j-th cell, $a(d_{i,j})$ is the amount of signal attenuation at the distance $d_{i,j}$, and F(•) is a function that models how the channel attenuates with the distance $d_{i,j}$.

The placement of the phased array, denoted as x, can be taken into account, and re-write the above relationship in a matrix form as follows:

$$S_{in} = H(x)w \tag{2}$$

The transmission signal $t_i$ can be omitted before beamforming hereafter because it is the same at each speaker.

Each cell in a passive acoustic metasurface modifies the incident signal (e.g., by adding a path delay and/or changing the amplitude). Such a modification can be captured using a matrix, denoted as G as further described herein. Then, the signal coming out of the passive acoustic metasurface becomes $$S_{out} = GH(x)w \tag{3}$$

Finally, let $R_d$ denote the signal in a given steering direction d from the passive acoustic metasurface. $R_d$ can be derived as follows, where $K_d$ denotes the steering vector corresponding to the direction d between the passive acoustic metasurface and target.

$$R_d = K_d GH(x)w \tag{4}$$

The goal is to jointly design the passive acoustic metasurface and codewords of the speaker array to maximize the signal strength along each angle of interest. For example, if a scanning angle from −60° to 60° is to be supported, for each angle within the range, the signal strength should be maximized. Note the passive acoustic metasurface has a fixed configuration across all angles, while the codeword can change for each beamforming angle as in typical beamforming scenarios. Therefore, the signal of interest R can be derived as follows:

$$R = KGH(x)W \tag{5}$$

where R is a matrix of size d×d (in which each row represents the received signal from a given direction d and each column represents the steering direction), K is a d×N matrix specifying the steering vector from the N unit-cell passive acoustic metasurface, G is an N×N matrix, and its diagonal elements specify how the N-cell passive acoustic metasurface translates the incident signal into the outgoing signal, H(x) is an N×M matrix specifying the channel from M transmitters to the N-cell passive acoustic metasurface, and W is M×d codebook for M speakers corresponding to d directions.

The channel H and steering vector K are fixed and can be derived analytically. Given H and K, a goal is to find the optimal static passive acoustic metasurface configuration G and codebook W to perform beamforming across a wide range of angles. Since the power of the beams in each direction is optimized, the power P of the received signal R is used hereafter, which is denoted by $P=|R|^2$.

Figure 7:
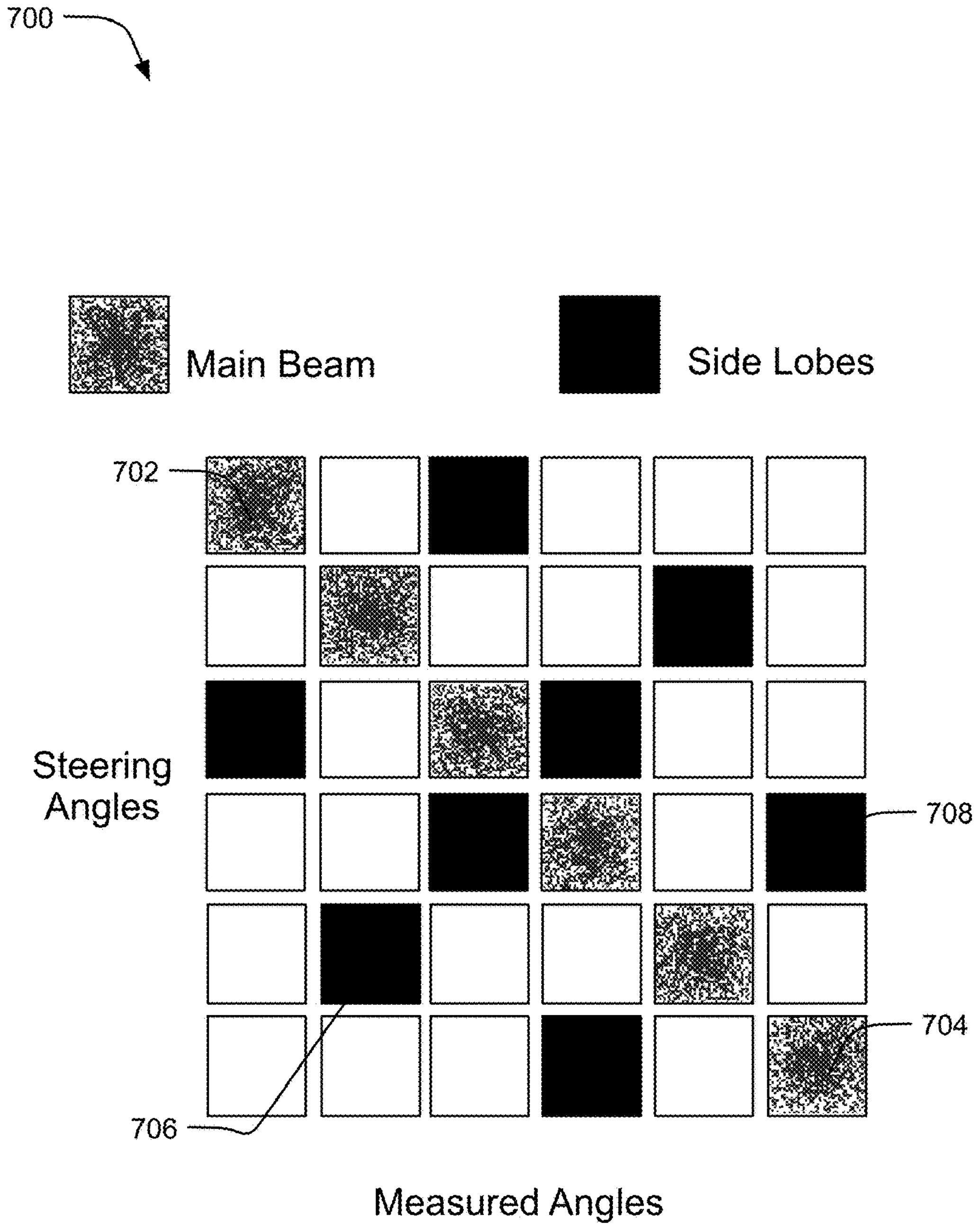
FIG. 7 illustrates an example structure of the received signal at various angles.

The structure of the received signals P at various angles is represented in FIG. 7 as having high signal strength along the diagonal elements, which indicates the signal is beamformed towards the desired steering angle.

In at least one implementation, the objective function comprises the following three terms:

Sum Power: Due to the use of a static metasurface design and the need to accommodate a wide range of angles, the goal is to maximize the sum of power across all d directions. This can be derived as follows:

$$L_{power} = tr(P) \tag{6}$$

where tr(•) is the trace of a matrix (i.e., the sum of the diagonal elements in the trace).

Minimum Variance Criterion: Solely maximizing the total power may introduce some dead zones for certain directions. To avoid that problem, the variance of the diagonal term of P is introduced as the penalty term $L_{var}$ to ensure all directions are covered:

$$L_{var} = \mathrm{var}(\mathrm{diag}(P)). \tag{7}$$

For generality, a weight matrix Q is introduced, which can put different weights on different angles. The result is:

$$L_{var} = \mathrm{var}(\mathrm{diag}(PQ)) \tag{8}$$

where $Q=\mathrm{diag}(q_1, q_2, \ldots, q_l)$ is a set of weights to control. If there is prior knowledge about the approximate location of a target, the entries in Q that correspond to the locations close to the target can be increased.

Minimum Sidelobe: Suppressing the side lobe level (SLL) is helpful for sensing and communication. Sidelobe nullification and minimization are two common methods of suppression. Some methods require prior knowledge about the direction of the sidelobe, while other methods minimize the maximum sidelobe. Minimizing the average SLL (i.e., minimizes the sum of absolute values of all non-diagonal peaks in P) is most effective in the present context, although other methods may be employed.

FIG. 7 illustrates an example structure 700 of the received signal at various angles. The structure 700 includes high signal strength along the diagonal elements (see, e.g., a diagonal element 702 and a diagonal element 704) corresponding to the main beam. The non-diagonal elements (see, e.g., a non-diagonal element 706 and a non-diagonal element 708) are considered "sidelobes" that can degrade the overall performance. Therefore, the sum of non-diagonal peaks can be minimized as follows:

$$L_{sidelobe} = \sum non\text{-}diagonalpeaks \tag{9}$$

To derive $L_{sidelobe}$, peaks in the P matrix are identified (e.g., using findpeaks( ) function), and then the peaks that are in non-diagonal entries of the matrix are summed. This process both reduces the sidelobes and improves the quality of the main lobe.

Figure 8:
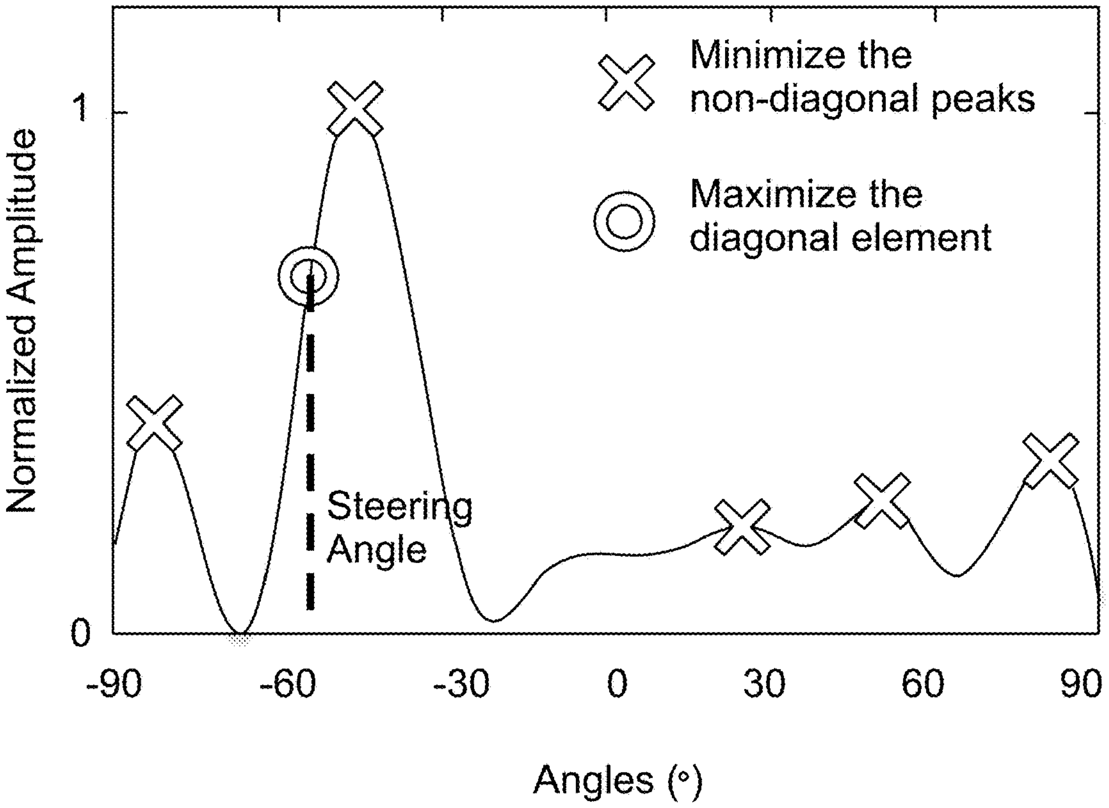
FIG. 8 illustrates example beam patterns when steered to a specific angle during optimization or tuning.

FIG. 8 illustrates example beam patterns 800 when steered to a specific angle during optimization or tuning. Minimizing the non-diagonal peaks helps reduce the side lobes and increase the directivity. If the highest peak is a non-diagonal element, it may be minimized to revise the direction. Putting these concepts together, the following optimization model results:

$$\min_{W,\Theta,x} -L_{power} + \mu L_{var} + \gamma L_{sidelobe}, \text{ where}$$

$$\text{s.t.} \begin{cases} |G_{ii}| = 1, & (i = 1, 2, \ldots, N) \\ |W_{ij}| \le 1 & (i = 1, 2, \ldots, M, j = 1, 2, \ldots, d) \end{cases}$$

where μ and γ are parameters controlling the importance of the variance and sidelobe terms, respectively. There are two constraints on the magnitude of the metasurface parameters G and codebook W. Both G and W should be no more than 1 in most implementations.

The constraints on the magnitude of metasurface G are referred to as constant modulus constraints (CMC). Problems involving CMC are nonconvex and NP-hard. In the described technology, $|G_{ii}|=1$ refers to the points on the surface of an N dimensional hypercube, which indicates each metasurface cell does not change the magnitude of the incoming signal. These are non-convex constraints. $|W_{ij}|\le 1$ are constraints on the magnitude of the phased array. The set contains the entire hypercube and includes the interior. Thus, it is a convex set. Therefore, for the phased array codebook, the amplitude may be restricted to be within 1 instead of exactly equal to 1 to make the problem easier to solve.

In various implementations, the problem is a non-linear constrained optimization problem. Due to the presence of the constraints, the gradient descent scheme cannot be directly applied. Therefore, the gradient projection method may be used, which ensures the solution after each gradient descent update still falls within the feasible set Ω. Specifically, if the k+1-th update (i.e., $x^{(k+1)}=x^{(k)}+a_k d^{(k)}$) makes the solution fall outside the feasible region, where $a_k$ is the learning rate, and $d^{(k)}$ is the gradient, it may be projected to a point inside the feasible set Ω as follows:

$$x^{(k+1)} = \Pi\left[x^{(k)} + \alpha_k d^{(k)}\right] \tag{10}$$

where Π is the projection operator, and Π[x] is called the projection of x in Ω. To do that, the amplitude of $G_{ii}$ is normalized after each update, and $W_{ij}$ is normalized if it is larger than 1. The Adam optimizer in Pytorch may be used for optimization. Adam is an extended version of stochastic gradient descent that adapts the learning rate for each parameter. The output from the Adam may be modified during each iteration using Equation 10 to ensure constraints are satisfied.

Figure 9:
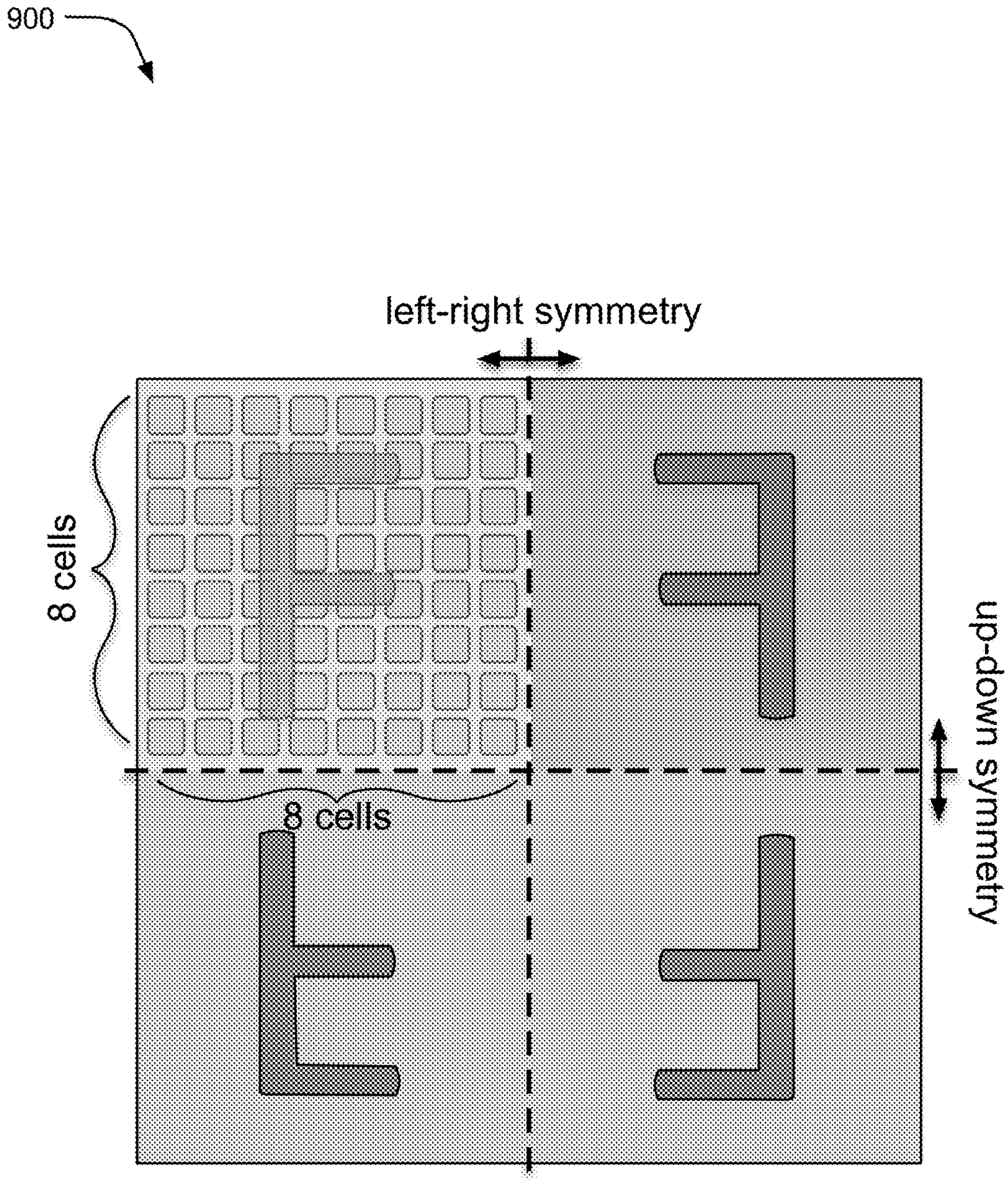
FIG. 9 illustrates a symmetry property of a 16×16 metasurface.

FIG. 9 illustrates a symmetry property of a 16×16 metasurface 900. As discussed above, the diagonal of variable G represents the phase delay for metasurface unit cells. The passive acoustic metasurface is a 2D structure. The configuration of the passive acoustic metasurface should be left-right symmetric and up-down symmetric, as shown in the example of the 16×16 metasurface 900, since the scanning performance should be the same in left and right in the azimuth direction, and the beam pattern should also be the same in top and bottom in the elevation direction. By utilizing the left-right and up-down symmetry properties, the search dimension for G can be reduced by 75%.

Since the steering angle is from −60° to 60°, the codebook in some implementations is also symmetric between the positive angles and negative angles. Therefore, half of the codebook can be optimized (i.e., corresponding to the steering angle in (−60°, 0)) and copied to generate the codebook for (0, 60°).

The channel H(x) can be determined based on the positions of the speakers and unit cells of the metasurface. Let $x=\{x_1, x_2, \ldots, x_M\}$ denote the speaker locations, and $g=\{g_1, g_2, \ldots, g_N\}$ denote the metasurface cells' locations. One can derive the channel as follows:

$$H(x) = \begin{bmatrix} F(\|x_1 - g_1\|) & \ldots & F(\|x_M - g_1\|) \\ F(\|x_1 - g_1\|) & \ldots & F(\|x_M - g_1\|) \\ \vdots & \ddots & \vdots \\ F(\|x_1 - g_N\|) & \ldots & F(\|x_M - g_N\|) \end{bmatrix} \tag{11}$$

where ||•|| denotes the distance between two points (i.e., a speaker and a metasurface unit cell) and F ( ) denotes the function that maps the distance to the wireless channel, including the amplitude and phase.

Figure 10:
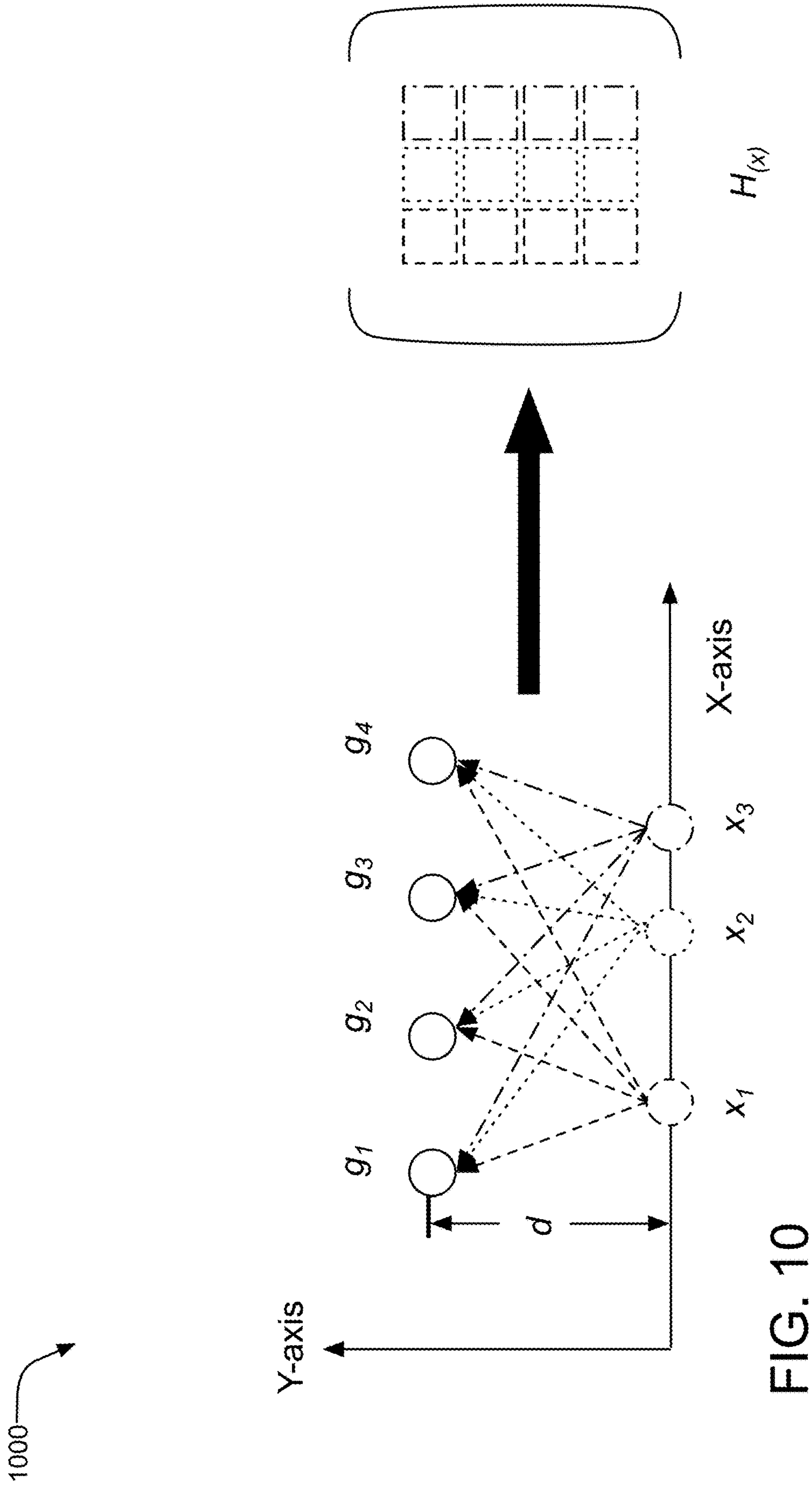
FIG. 10 illustrates an example of a channel matrix with 4 metasurface cells and 3 speakers of varying speaker distributions.

FIG. 10 illustrates an example 1000 of a channel matrix H with 4 metasurface cells and 3 speakers of varying speaker distributions x. The distance between each speaker and metasurface cell may be derived to determine the channel H between the phased array and metasurface.

In another example implementation, a joint optimization algorithm for metasurface macroscopic configuration and receiving beamforming weights is as follows. (This algorithm can be implemented in the acoustic system as well as in an electromagnetic system, such as for Low Earth Orbit (LEO) communication.) For incoming signals x passing through a metasurface and arriving at multiple receiving transceivers/antennas, the angle of arrival (AoA) information between the target and receiving transceiver/antenna is obtained.

Returning to the implementation using Equation 11, either a given phased array setup (e.g., uniformly distributed linear array) or an optimized phased array setup can be used as the input. In the latter case, $x_i$ is treated as the optimization variable along with the other variables. Note that no constraints are imposed on x because of the symmetry property of metasurface G and codebook W, although constraints may be imposed in some implementations. Equation 11 assumes a single line-of-sight path between the phased array and metasurface, which is realistic since the metasurface is close to the phased array and there is no blockage.

Figure 11:
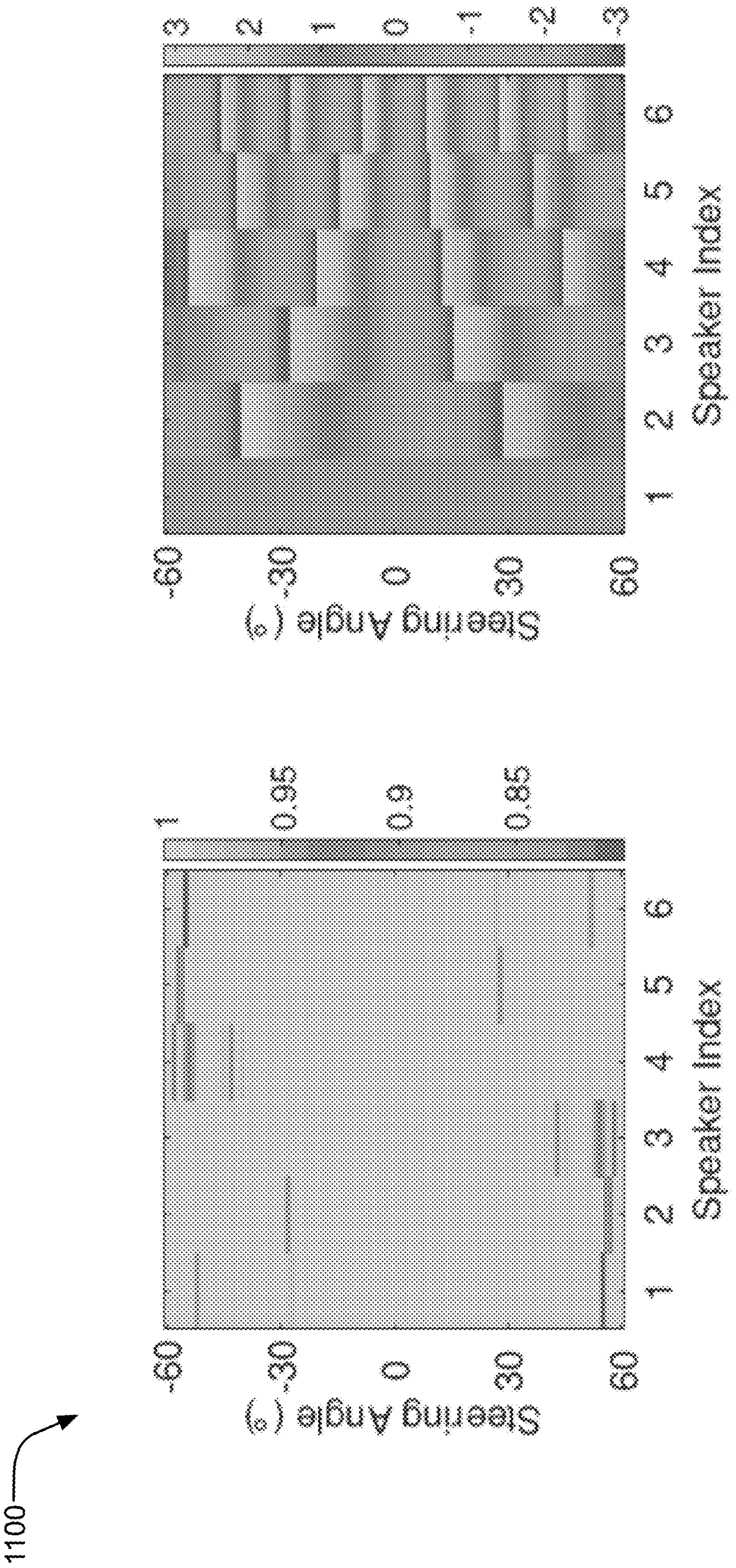
FIG. 11 illustrates diagrams showing (a) the amplitude and (b) the phase of an optimized codebook, where the first speaker is set as the reference and is aligned to zero phase.
Figure 12:
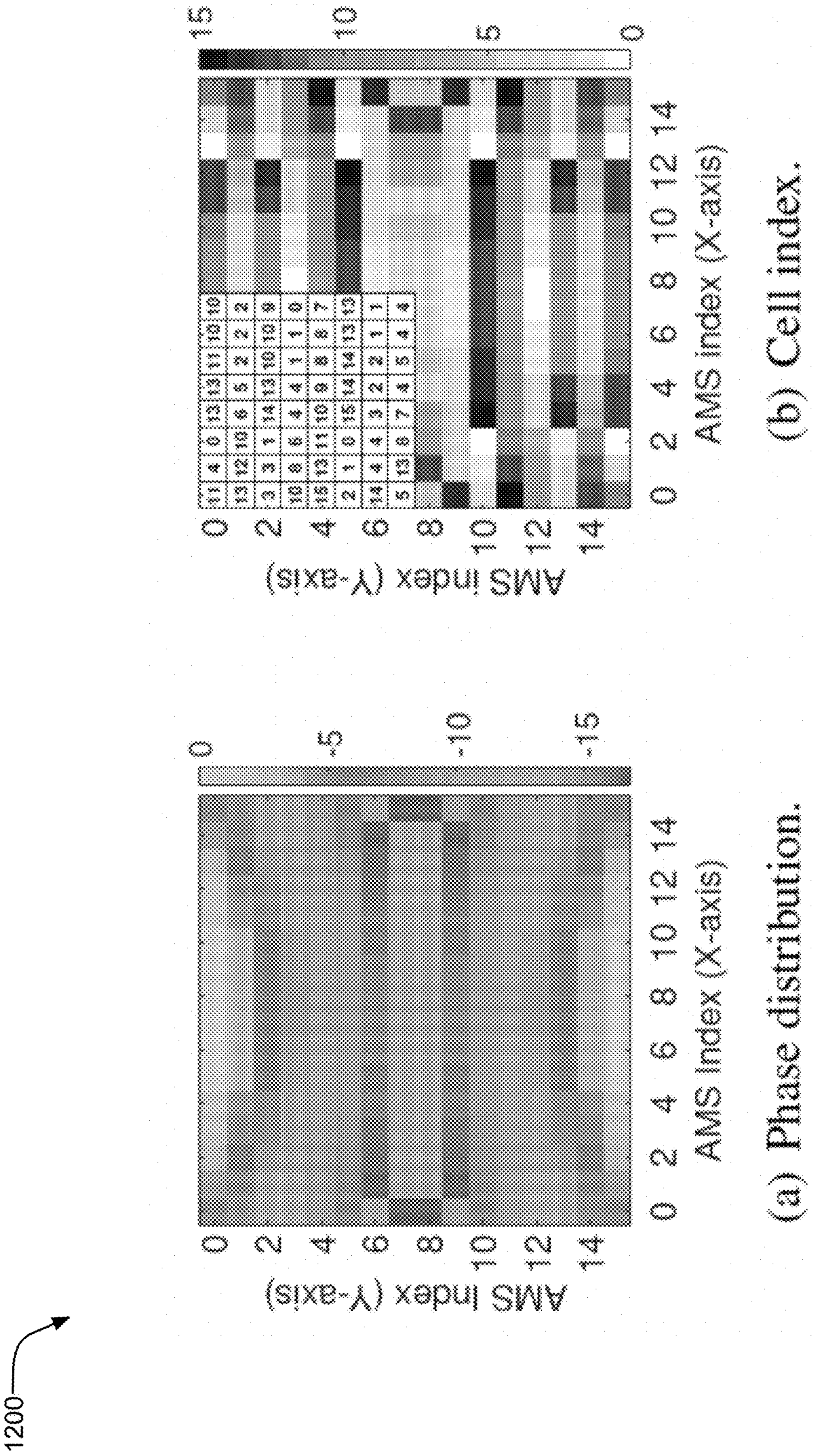
FIG. 12 illustrates diagrams showing example results for (a) phase distribution and (b) cell indices of the optimized metasurface design.

FIG. 11 illustrates diagrams 1100 showing (a) the amplitude and (b) the phase of an optimized codebook, where the first speaker is set as the reference and is aligned to be zero phase. Angles are sampled from −60° to 60° with 1° separation for an example system design. Therefore, for a 6-speaker system, the codebook W is a 121×6 matrix, which contains 121 independent codewords for 121 directions and 6 speakers. Since the goal is to maximize the sum power of diagonal elements, the amplitude of each element in the codebook is close to 1 to achieve the maximum transmission power, but some are slightly less than 1 since their constraints are ≤1, while the phase is manipulated to generate a desired sound field at the metasurface. It should be understood that a phased speaker array can transmit acoustic signals with select signal properties according to a transmission codebook, and a phased microphone array can receive acoustic signals with select signal properties according to a reception codebook FIG. 12 illustrates diagrams 1200 showing example results for (a) phase distribution and (b) cell indices of the optimized 16×16 metasurface design. The phase distribution of the metasurface is reconstructed by utilizing the diagonal elements of G and the symmetry property. As mentioned above, the phase shift of each passive acoustic metasurface unit cell is quantized to 16 levels for flexible design and assembly/disassembly. The numbers in the upper left corner denote the cell indices for the top left metasurface, and the quadrants are omitted for brevity due to the left-right symmetry and top-bottom symmetry. Then, the final passive acoustic metasurface can be assembled by choosing the unit cells with the closest phase shift, where the color reflects the unit cell index and a higher index indicates a larger phase shift. The speakers can either be placed in the phased array uniformly or arbitrarily, and the placement can be fed to the optimization algorithm, or the algorithm can optimize the placement along with other configuration parameters.

An example experimental setup may used for an evaluation. The system can be divided into three parts: speakers, microphones, and a passive acoustic metasurface. Uniform placement of components can be used as the default configuration. In this case, six (6) identical miniature speakers (16Ω, 0.25 W) can be provided as the transmitter. Each speaker was connected with an operational amplifier THS4001 to amplify the voltage and a power amplifier LM386 to amplify the current. The distance between the centers of adjacent speakers can be 8.6 mm, which is a half wavelength of 20 kHz sound. Four (4) microphones can be used to form a microphone array as a receiver. The distances between the four (4) microphones can be 3.06 cm, 2.04 cm, and 3.06 cm to reduce ambiguity and obtain better performance. All speakers and microphones can be connected to the same Bela board for signal synchronization. Speaker placement can also be optimized using the approach described above.

The passive acoustic metasurface was constructed according to the optimization process described above. The passive acoustic metasurface consists of 256 (16×16) unit cells spanning over 15 cm×15 cm. Since the unit cells are quantized into 16 choices, 16 different types of unit cells were 3D printed and assembled into an acoustic lens according to the evaluation scenario. For example, a passive acoustic metasurface was assembled for a 1-speaker setup, a different passive acoustic metasurface was assembled for 6 speakers with uniform separation, and another passive acoustic metasurface was assembled for 6 speakers with non-uniform separation. Each was jointly designed with the speaker array. To ensure most signals emitted by the speakers passed through the passive acoustic metasurface, the passive acoustic metasurface was placed 2 cm away from the speaker array. For a single speaker, the passive acoustic metasurface was placed 10 cm away from the speaker.

The approach was evaluated in terms of (i) SNR, (ii) sensing accuracy, and (iii) communication performance. For acoustic sensing, Kinect V3 was used to determine the ground truth distance and AoA. The speakers transmitted the following FMCW signal:

$$tx(t) = \cos\left(2\pi f_{min} t + \frac{\pi B t^2}{T}\right),$$

where $f_{min}$=16 kHz, B=4 kHz, and T=0.1 s. The sensing accuracy was quantified using distance error and AoA error.

1D MUSIC is an AoA estimation algorithm that computes the auto-correlation matrix R of the received signals x as $R=x^H x$, where x is a 1×N vector and $x^H$ is the conjugate transpose of x, and then performs eigenvalue decomposition on R. Let $R_N$ represent the noise space matrix, which is the space spanned by the N−M smallest eigenvectors, where M is the number of signals. The peak in the pseudo spectrum $$p(\theta) = \frac{1}{a(\theta)^H R_N R_N^H a(\theta)}$$

corresponds to the AoA.

For acoustic communication, the data was encoded using OFDM. Each OFDM frame contains 180 Binary Phase-shift keying (BPSK) symbols, which are striped onto 12 subcarriers spanning over 18 kHz-20 kHz. CDMA was used as FEC code to improve resilience, and the code rate was 50%. The communication performance was quantified using bit error rate (BER) and frame error rate (FER). While there are other coding schemes for acoustic communication, the benefit of the approach (i.e., a passive acoustic metasurface with a speaker array) is likely similar across different acoustic coding schemes.

Unless otherwise specified, all results reported herein are from testbed experiments. In one example, a 6-speaker array with an equal separation of 9.4 mm between the adjacent speakers and a 16×16 passive acoustic metasurface were used. In device-free acoustic sensing experiments, the microphone array was 3 cm above the passive acoustic metasurface to track the distance and AoA from the hand of a person so that the signal from the speaker to the target passed through the metasurface and the signal was reflected from the target (hand) and received by the microphone array did not pass through the metasurface. In acoustic communication experiments, the receiver was placed 1.5 m away from the speaker array. The impact of various parameters was also evaluated by varying their values.

Figure 13:
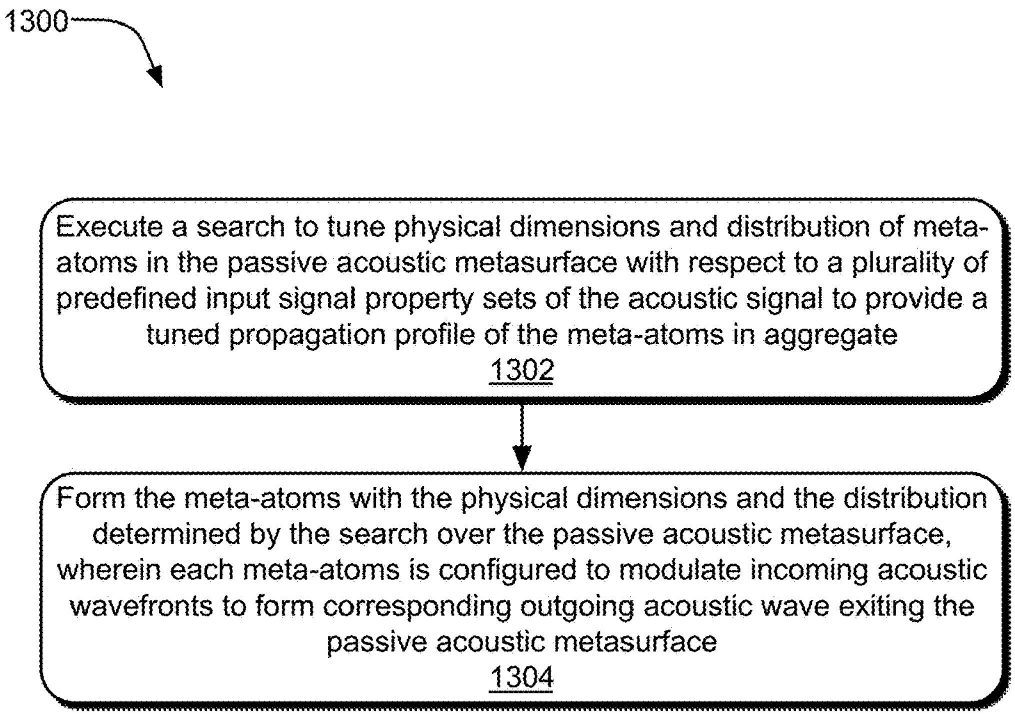
FIG. 13 illustrates example operations for designing a passive acoustic metasurface.

FIG. 13 illustrates example operations 1300 for designing a passive acoustic metasurface. The passive acoustic metasurface is designed to interact with an acoustic signal received at the passive acoustic metasurface from an acoustic transmitter. A searching operation 1302 executes a search to tune the physical dimensions and distribution of meta-atoms in the passive acoustic metasurface with respect to a plurality of predefined input signal property sets of the acoustic signal to provide a tuned propagation profile of the meta-atoms in aggregate. A forming operation 1304 forms the meta-atoms with the physical dimensions and the distribution determined by the search over the passive acoustic metasurface. Each meta-atom is configured to modulate incoming acoustic wavefronts to form corresponding outgoing acoustic waves exiting the passive acoustic metasurface. The tuned propagation profile in aggregate supports the plurality of predefined input signal property sets of the incoming acoustic wavefronts and, for each input signal property set, the physical dimensions and the distribution of the meta-atoms are tuned according to the tuned propagation profile to modulate the incoming acoustic wavefronts to generate a predefined beam pattern of the acoustic signal exiting the passive acoustic metasurface corresponding to a select input signal property set of a plurality of predefined input signal property sets.

Figure 14:
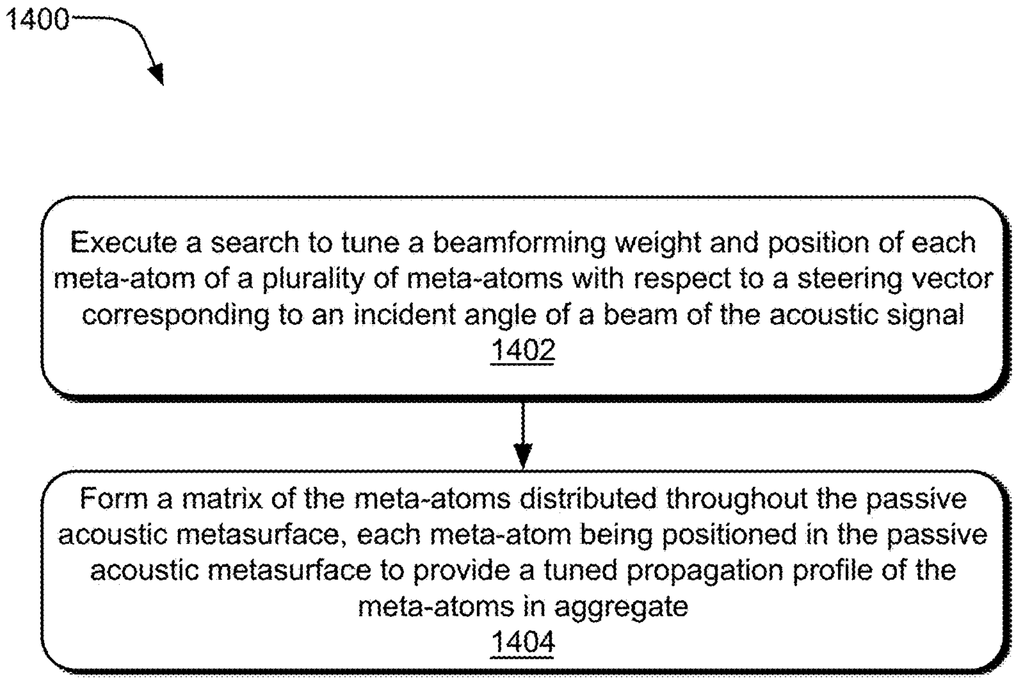
FIG. 14 illustrates example operations for manufacturing a passive acoustic metasurface.

FIG. 14 illustrates example operations 1400 for manufacturing a passive acoustic metasurface. The passive acoustic metasurface is manufactured to interact with an acoustic signal received at the passive acoustic metasurface. A searching operation 1402 executes a search to tune a beamforming weight and position of each meta-atom of a plurality of meta-atoms with respect to a steering vector corresponding to an incident angle of a beam of the acoustic signal. A forming operation 1404 forms a matrix of the meta-atoms distributed throughout the passive acoustic metasurface, each meta-atom being positioned in the passive acoustic metasurface to provide a tuned propagation profile of the meta-atoms in aggregate. Each meta-atom provides a propagation path for at least a beam of the acoustic signal. Each meta-atom interacts with the acoustic signal to modulate incoming acoustic wavefronts of the acoustic signal received by the meta-atom to form corresponding outgoing acoustic wavefronts of the acoustic signal exiting the passive acoustic metasurface. The tuned propagation profile of the meta-atoms in aggregate supports a plurality of predefined input signal property sets of the incoming acoustic wavefronts and, for each input signal property set, physical dimensions and distribution of the meta-atoms in the passive acoustic metasurface are tuned according to the tuned propagation profile to phase shift the incoming acoustic wavefronts to generate a predefined beam pattern of the acoustic signal exiting the passive acoustic metasurface corresponding to the input signal property set.

Figure 15:
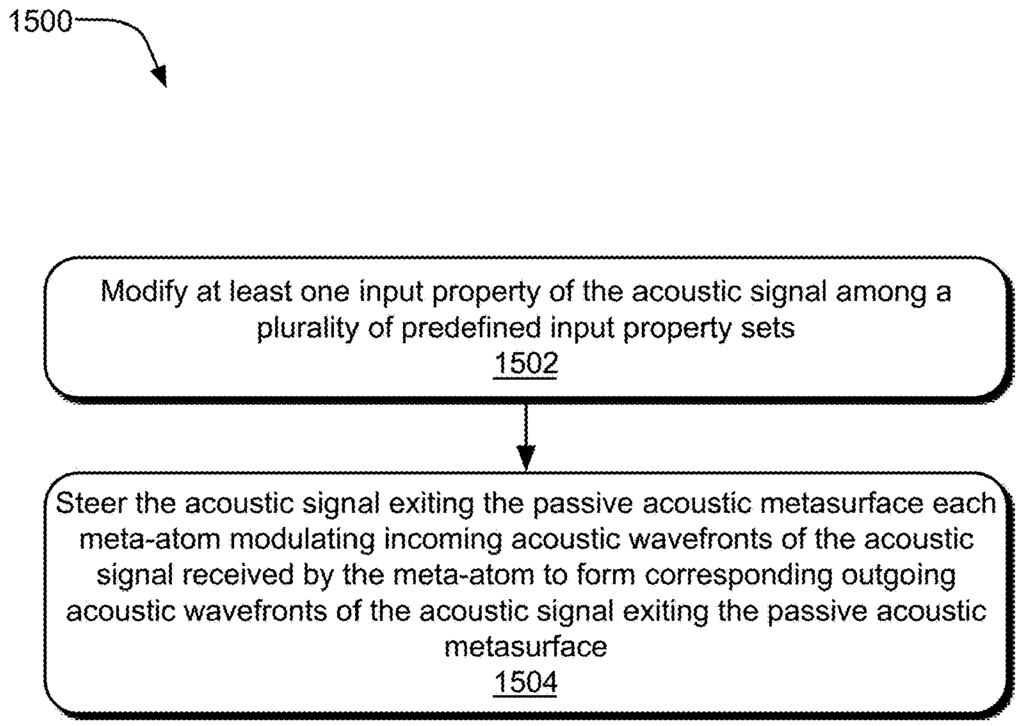
FIG. 15 illustrates example operations for using a passive acoustic metasurface.

FIG. 15 illustrates example operations 1500 for using a passive acoustic metasurface. The passive acoustic metasurface is manufactured to interact with an acoustic signal received at the passive acoustic metasurface. A signal modification operation 1502 modifies at least one input property of the acoustic signal among a plurality of predefined input property sets. The passive acoustic metasurface is formed as a matrix of meta-atoms distributed throughout the passive acoustic metasurface, each meta-atom being positioned in the passive acoustic metasurface to provide a tuned propagation profile of the meta-atoms in aggregate, each meta-atom providing a propagation path for at least a beam of the acoustic signal. A steering operation 1504 steers the acoustic signal exiting the passive acoustic metasurface, each meta-atom modulating incoming acoustic wavefronts of the acoustic signal received by the meta-atom to form corresponding outgoing acoustic wavefronts of the acoustic signal exiting the passive acoustic metasurface. The tuned propagation profile of the meta-atoms in aggregate supports the plurality of predefined input signal property sets of the incoming acoustic wavefronts and, for each input signal property set, physical dimensions and distribution of the meta-atoms in the passive acoustic metasurface are tuned according to the tuned propagation profile to phase shift the incoming acoustic wavefronts to generate a predefined beam pattern of the acoustic signal exiting the passive acoustic metasurface corresponding to the input signal property set.

Figure 16:
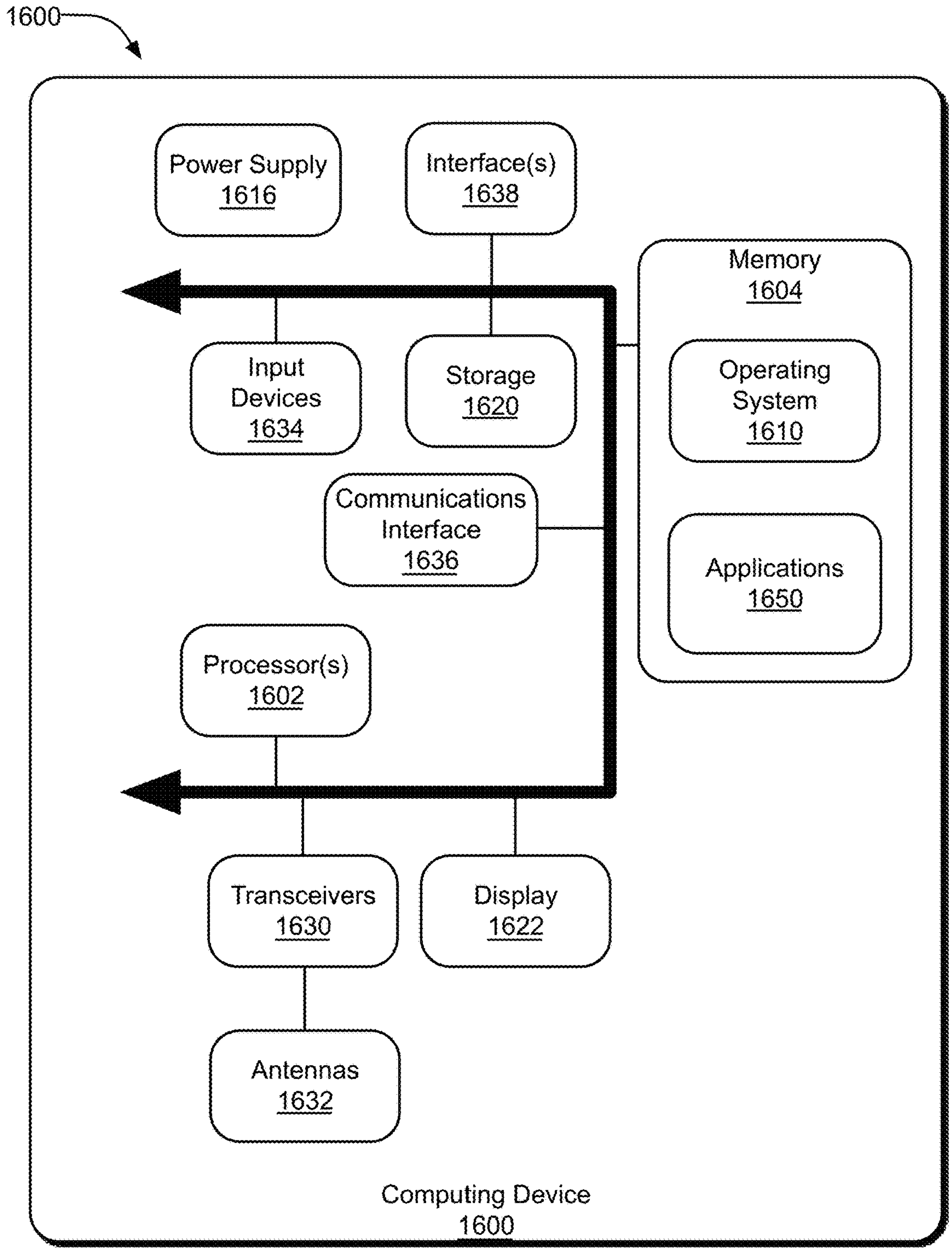
FIG. 16 illustrates an example computing device for use in implementing the described technology.

FIG. 16 illustrates an example computing device 1600 for use in implementing the described technology. The computing device 1600 may be a client computing device (such as a laptop computer, a desktop computer, or a tablet computer), a server/cloud computing device, an Internet-of-Things (IoT), any other type of computing device, or a combination of these options. The computing device 1600 includes one or more hardware processor(s) 1602 and a memory 1604. The memory 1604 generally includes both volatile memory (e.g., RAM) and nonvolatile memory (e.g., flash memory), although one or the other type of memory may be omitted. An operating system 1610 resides in the memory 1604 and is executed by the processor(s) 1602. In some implementations, the computing device 1600 includes and/or is communicatively coupled to storage 1620.

In the example computing device 1600, as shown in FIG. 16, one or more software modules, segments, and/or processors, such as applications 1650, various types of simulation software, numerical modeling software, phased array transmitter/receiver control software, and other program code and modules are loaded into the operating system 1610 on the memory 1604 and/or the storage 1620 and executed by the processor(s) 1602. The storage 1620 may store codebooks, codewords, phase shift parameters, amplitude parameters, steering angles, and other data and be local to the computing device 1600 or may be remote and communicatively connected to the computing device 1600. In particular, in one implementation, components of a system for designing, manufacturing, and/or using a passive acoustic metasurface may be implemented entirely in hardware or in a combination of hardware circuitry and software.

The computing device 1600 includes a power supply 1616, which may include or be connected to one or more batteries or other power sources and which provides power to other components of the computing device 1600. The power supply 1616 may also be connected to an external power source that overrides or recharges the built-in batteries or other power sources.

The computing device 1600 may include one or more communication transceivers 1630, which may be connected to one or more antenna(s) 1632 to provide network connectivity (e.g., mobile phone network, Wi-Fi®, Bluetooth®) to one or more other servers, client devices, IoT devices, and other computing and communications devices. The computing device 1600 may further include a communications interface 1636 (such as a network adapter or an I/O port, which are types of communication devices). The computing device 1600 may use the adapter and any other types of communication devices for establishing connections over a wide-area network (WAN) or local-area network (LAN). It should be appreciated that the network connections shown are exemplary and that other communications devices and means for establishing a communications link between the computing device 1600 and other devices may be used.

The computing device 1600 may include one or more input devices 1634 such that a user may enter commands and information (e.g., a keyboard, trackpad, or mouse). These and other input devices may be coupled to the server by one or more interfaces 1638, such as a serial port interface, parallel port, or universal serial bus (USB). The computing device 1600 may further include a display 1622, such as a touchscreen display.

The computing device 1600 may include a variety of tangible processor-readable storage media and intangible processor-readable communication signals. Tangible processor-readable storage can be embodied by any available media that can be accessed by the computing device 1600 and can include both volatile and nonvolatile storage media and removable and non-removable storage media. Tangible processor-readable storage media excludes intangible and transitory communications signals (such as signals per se) and includes volatile and nonvolatile, removable and non-removable storage media implemented in any method, process, or technology for storage of information such as processor-readable instructions, data structures, program modules, or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage, or other magnetic storage devices, or any other tangible medium which can be used to store the desired information and which can be accessed by the computing device 1600. In contrast to tangible processor-readable storage media, intangible processor-readable communication signals may embody processor-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Clause 1. A method of designing a passive acoustic metasurface for interacting with an acoustic signal received at the passive acoustic metasurface from an acoustic transmitter, the method comprising: executing a search to tune physical dimensions and distribution of meta-atoms in the passive acoustic metasurface with respect to a plurality of predefined input signal property sets of the acoustic signal to provide a tuned propagation profile of the meta-atoms in aggregate; and forming the meta-atoms with the physical dimensions and the distribution determined by the search over the passive acoustic metasurface, wherein each meta-atom is configured to modulate incoming acoustic wavefronts to form corresponding outgoing acoustic wave exiting the passive acoustic metasurface, wherein the tuned propagation profile in aggregate supports the plurality of predefined input signal property sets of the incoming acoustic wavefronts and, for each input signal property set, the physical dimensions and the distribution of the meta-atoms are tuned according to the tuned propagation profile to modulate the incoming acoustic wavefronts to generate a predefined beam pattern of the acoustic signal exiting the passive acoustic metasurface corresponding to a select input signal property set of the plurality of predefined input signal property sets.

Clause 2. The method of clause 1, wherein each of the plurality of predefined input signal property sets includes an angle of incidence of an incoming beam of the acoustic signal.

Clause 3. The method of clause 1, wherein the acoustic transmitter includes multiple acoustic transmitters forming a phased array to transmit the acoustic signal to the passive acoustic metasurface according to a codeword of a transmission codebook to generate the predefined beam pattern towards the passive acoustic metasurface and the codeword corresponds to one of the predefined input signal property sets, wherein the transmission codebook of the phased array and the meta-atoms of the passive acoustic metasurface are tuned to realize a corresponding predefined output beam pattern.

Clause 4. The method of clause 3, wherein the search is configured to optimize a user-defined function or a function of signal-to-noise ratio (SNR) or sum capacity at a specified set of angles.

Clause 5. The method of clause 1, wherein multiple acoustic receivers forming a phased array to receive the acoustic signal from the passive acoustic metasurface according to a codeword of a reception codebook to combine received signals at multiple receivers from the passive acoustic metasurface and the codeword corresponds to one of the predefined input signal property sets, wherein the reception codebook of the phased array and the meta-atoms of the passive acoustic metasurface are tuned to realize a corresponding predefined goal.

Clause 6. The method of clause 5, wherein the search is configured to optimize a user-defined function or a function of signal-to-noise ratio (SNR) or sum capacity at a specified set of angles.

Clause 7. The method of clause 1, wherein the acoustic transmitter includes multiple acoustic transmitters to form a phased transmitter array, and multiple acoustic receivers to form a phased receiver array configured to receive the acoustic signal from the passive acoustic metasurface, wherein the multiple acoustic transmitters use a codeword from a transmission codebook and the multiple acoustic receivers use a codeword from a reception codebook, and the transmission codebook, the reception codebook, and the passive acoustic metasurface are jointly tuned to realize a predefined goal.

Clause 8. The method of clause 7, wherein the search is configured to optimize a user-defined function or a function of signal-to-noise ratio (SNR) or sum capacity at a specified set of angles.

Clause 9. The method of clause 1, wherein the passive metasurface is designed for acoustic sensing including distance estimation or angle of arrival estimation or for acoustic communications.

Clause 10. A passive acoustic metasurface system for interacting with an acoustic signal received at the passive acoustic metasurface system from an acoustic transmitter, the passive acoustic metasurface system comprising: a passive acoustic metasurface designed by executing a search to tune physical dimensions and distribution of meta-atoms in the passive acoustic metasurface with respect to a plurality of predefined input signal property sets of the acoustic signal to provide a tuned propagation profile of the meta-atoms in aggregate, and manufactured by forming the meta-atoms with the physical dimensions and the distribution determined by the search over the passive acoustic metasurface, wherein each meta-atom is configured to modulate incoming acoustic wavefronts to form corresponding outgoing acoustic wave exiting the passive acoustic metasurface, wherein the tuned propagation profile in aggregate supports the plurality of predefined input signal property sets of the incoming acoustic wavefronts and, for each input signal property set, the physical dimensions and the distribution of the meta-atoms are tuned according to the tuned propagation profile to modulate the incoming acoustic wavefronts to generate a predefined beam pattern of the acoustic signal exiting the passive acoustic metasurface corresponding to a select input signal property set plurality of predefined input signal property sets.

Clause 11. The passive acoustic metasurface system of clause 10, wherein each of the plurality of predefined input signal property sets includes an angle of incidence of an incoming beam of the acoustic signal.

Clause 12. The passive acoustic metasurface system of clause 10, wherein the acoustic transmitter includes multiple acoustic transmitters forming a phased array to transmit the acoustic signal to the passive acoustic metasurface according to a codeword of a transmission codebook to generate the predefined beam pattern towards the passive acoustic metasurface and the codeword corresponds to one of the predefined input signal property sets, wherein the transmission codebook of the phased array and the meta-atoms of the passive acoustic metasurface are tuned to realize a corresponding predefined output beam pattern.

Clause 13. The passive acoustic metasurface system of clause 12, wherein the search is configured to optimize a user-defined function or a function of signal-to-noise ratio (SNR) or sum capacity at a specified set of angles.

Clause 14. The passive acoustic metasurface system of clause 10, wherein multiple acoustic receivers forming a phased array to receive the acoustic signal from the passive acoustic metasurface according to a codeword of a reception codebook to combine received signals at multiple receivers from the passive acoustic metasurface and the codeword corresponds to one of the predefined input signal property sets, wherein the reception codebook of the phased array and the meta-atoms of the passive acoustic metasurface are tuned to realize a corresponding predefined goal.

Clause 15. The passive acoustic metasurface system of clause 14, wherein the search is configured to optimize a user-defined function or a function of signal-to-noise ratio (SNR) or sum capacity at a specified set of angles.

Clause 16. The passive acoustic metasurface system of clause 10, wherein the acoustic transmitter includes multiple acoustic transmitters to form a phased transmitter array, and multiple acoustic receivers to form a phased receiver array configured to receive the acoustic signal from the passive acoustic metasurface, wherein the multiple acoustic transmitters use a codeword from a transmission codebook and the multiple acoustic receivers use a codeword from a reception codebook, and the transmission codebook, the reception codebook, and the passive acoustic metasurface are jointly tuned to realize a predefined goal.

Clause 17. The passive acoustic metasurface system of clause 16, wherein the search is configured to optimize a user-defined function or a function of signal-to-noise ratio (SNR) or sum capacity at a specified set of angles.

Clause 18. The passive acoustic metasurface system of clause 10, wherein the passive acoustic metasurface is used for one or more of motion tracking, breath monitoring, or communications.

Clause 19. The passive acoustic metasurface system of clause 10, wherein the passive metasurface is designed for acoustic sensing including distance estimation or angle of arrival estimation or for acoustic communications.

Clause 20. One or more tangible processor-readable storage media embodied with instructions for executing on one or more processors and circuits of a computing device a process for designing a passive acoustic metasurface for interacting with an acoustic signal received at the passive acoustic metasurface from an acoustic transmitter, the process comprising: executing a search to tune physical dimensions and distribution of meta-atoms in the passive acoustic metasurface with respect to a plurality of predefined input signal property sets of the acoustic signal to provide a tuned propagation profile of the meta-atoms in aggregate; wherein the meta-atoms of the passive acoustic metasurface are formed with the physical dimensions and the distribution determined by the search over the passive acoustic metasurface, wherein each meta-atom is configured to modulate incoming acoustic wavefronts to form corresponding outgoing acoustic wave exiting the passive acoustic metasurface, wherein the tuned propagation profile in aggregate supports the plurality of predefined input signal property sets of the incoming acoustic wavefronts and, for each input signal property set, the physical dimensions and the distribution of the meta-atoms are tuned according to the tuned propagation profile to modulate the incoming acoustic wavefronts to generate a predefined beam pattern of the acoustic signal exiting the passive acoustic metasurface corresponding to a select input signal property set plurality of predefined input signal property sets.

Clause 21. The one or more tangible processor-readable storage media of clause 20, wherein each of the plurality of predefined input signal property sets includes an angle of incidence of an incoming beam of the acoustic signal.

Clause 22. The one or more tangible processor-readable storage media of clause 20, wherein the acoustic transmitter includes multiple acoustic transmitters forming a phased array to transmit the acoustic signal to the passive acoustic metasurface according to a codeword of a transmission codebook to generate the predefined beam pattern towards the passive acoustic metasurface and the codeword corresponds to one of the predefined input signal property sets, wherein the transmission codebook of the phased array and the meta-atoms of the passive acoustic metasurface are tuned to realize a corresponding predefined output beam pattern.

Clause 23. The one or more tangible processor-readable storage media of clause 20, wherein the search is configured to optimize a user-defined function or a function of signal-to-noise ratio (SNR) or sum capacity at a specified set of angles.

Clause 24. The one or more tangible processor-readable storage media of clause 20, wherein multiple acoustic receivers forming a phased array to receive the acoustic signal from the passive acoustic metasurface according to a codeword of a reception codebook to combine received signals at multiple receivers from the passive acoustic metasurface and the codeword corresponds to one of the predefined input signal property sets, wherein the reception codebook of the phased array and the meta-atoms of the passive acoustic metasurface are tuned to realize a corresponding predefined goal.

Clause 25. The one or more tangible processor-readable storage media of clause 24, wherein the search is configured to optimize a user-defined function or a function of signal-to-noise ratio (SNR) or sum capacity at a specified set of angles.

Clause 26. The one or more tangible processor-readable storage media of clause 20, wherein the acoustic transmitter includes multiple acoustic transmitters to form a phased transmitter array, and multiple acoustic receivers to form a phased receiver array configured to receive the acoustic signal from the passive acoustic metasurface, wherein the multiple acoustic transmitters use a codeword from a transmission codebook and the multiple acoustic receivers use a codeword from a reception codebook, and the transmission codebook, the reception codebook, and the passive acoustic metasurface are jointly tuned to realize a predefined goal.

Clause 27. The one or more tangible processor-readable storage media of clause 26, wherein the search is configured to optimize a user-defined function or a function of signal-to-noise ratio (SNR) or sum capacity at a specified set of angles.

Clause 28. The one or more tangible processor-readable storage media of clause 20, wherein the passive metasurface is designed for acoustic sensing including distance estimation or angle of arrival estimation or for acoustic communications.

Clause 29. A passive acoustic metasurface for interacting with an acoustic signal received at the passive acoustic metasurface, the passive acoustic metasurface comprising: a matrix of meta-atoms distributed throughout the passive acoustic metasurface, each meta-atom being positioned in the passive acoustic metasurface to provide a tuned propagation profile of the meta-atoms in aggregate, each meta-atom providing a propagation path for at least a beam of the acoustic signal, each meta-atom interacting with the acoustic signal to modulate incoming acoustic wavefronts of the acoustic signal received by the meta-atom to form corresponding outgoing acoustic wavefronts of the acoustic signal exiting the passive acoustic metasurface, wherein the tuned propagation profile of the meta-atoms in aggregate supports a plurality of predefined input signal property sets of the incoming acoustic wavefronts and, for each input signal property set, physical dimensions and distribution of the meta-atoms in the passive acoustic metasurface are tuned according to the tuned propagation profile to phase shift the incoming acoustic wavefronts to generate a predefined beam pattern of the acoustic signal exiting the passive acoustic metasurface corresponding to the input signal property set.

Clause 30. The passive acoustic metasurface of clause 29, wherein the tuned propagation profile of the meta-atoms in aggregate is based on a search for beamforming weights corresponding to different angles of arrival.

Clause 31. The passive acoustic metasurface of clause 29, wherein the tuned propagation profile of the meta-atoms in aggregate is based on a search for a phase delay for each metasurface cells of the passive acoustic metasurface.

Clause 32. The passive acoustic metasurface of clause 29, wherein each of the plurality of predefined input signal property sets includes an angle of incidence of the beam of the acoustic signal.

Clause 33. The passive acoustic metasurface of clause 29, wherein each of the plurality of predefined input signal property sets includes a phase of the beam of the acoustic signal.

Clause 34. The passive acoustic metasurface of clause 29, wherein each of the plurality of predefined input signal property sets includes a magnitude of the beam of the acoustic signal.

Clause 35. The passive acoustic metasurface of clause 29, wherein an acoustic transmitter includes multiple acoustic transmitting transceivers forming a phased array to transmit the acoustic signal to the passive acoustic metasurface according to a codeword of a transmission codebook to generate the predefined beam pattern towards the passive acoustic metasurface and the codeword corresponds to one of the predefined input signal property sets, wherein the transmission codebook of the phased array and the meta-atoms of the passive acoustic metasurface are tuned to realize a corresponding predefined output beam pattern.

Clause 36. The passive acoustic metasurface of clause 29, wherein multiple acoustic receivers forming a phased array to receive the acoustic signal from the passive acoustic metasurface according to a codeword of a reception codebook to combine received signals at multiple receivers from the passive acoustic metasurface and the codeword corresponds to one of the predefined input signal property sets, wherein the reception codebook of the phased array and the meta-atoms of the passive acoustic metasurface are tuned to realize a corresponding predefined goal.

Clause 37. The passive acoustic metasurface of clause 29, wherein an acoustic transmitter includes multiple acoustic transmitting transceivers and multiple acoustic receiving transceivers form another phased array configured to receive the acoustic signal from the passive acoustic metasurface, wherein the multiple acoustic transmitting transceivers use a codeword from a transmission codebook and the multiple acoustic receiving transceivers use a codeword from a reception codebook, and the transmission codebook, the reception codebook, and the passive acoustic metasurface are jointly tuned to realize a predefined goal.

Clause 38. A method of manufacturing a passive acoustic metasurface for interacting with an acoustic signal received at the passive acoustic metasurface, the method comprising: executing search to tune a beamforming weight and position of each meta-atom of a plurality of meta-atoms with respect to a steering vector corresponding to an incident angle of a beam of the acoustic signal; and forming a matrix of the meta-atoms distributed throughout the passive acoustic metasurface, each meta-atom being positioned in the passive acoustic metasurface to provide a tuned propagation profile of the meta-atoms in aggregate, each meta-atom providing a propagation path for at least a beam of the acoustic signal, each meta-atom interacting with the acoustic signal to modulate incoming acoustic wavefronts of the acoustic signal received by the meta-atom to form corresponding outgoing acoustic wavefronts of the acoustic signal exiting the passive acoustic metasurface, wherein the tuned propagation profile of the meta-atoms in aggregate supports a plurality of predefined input signal property sets of the incoming acoustic wavefronts and, for each input signal property set, physical dimensions and distribution of the meta-atoms in the passive acoustic metasurface are tuned according to the tuned propagation profile to phase shift the incoming acoustic wavefronts to generate a predefined beam pattern of the acoustic signal exiting the passive acoustic metasurface corresponding to the input signal property set.

Clause 39. The method of clause 38, wherein the tuned propagation profile of the meta-atoms in aggregate is based on a search for beamforming weights corresponding to different angles of arrival.

Clause 40. The method of clause 38, wherein the tuned propagation profile of the meta-atoms in aggregate is based on a search for a phase delay for each metasurface cells of the passive acoustic metasurface.

Clause 41. The method of clause 38, wherein each of the plurality of predefined input signal property sets includes an angle of incidence of the beam of the acoustic signal.

Clause 42. The method of clause 38, wherein each of the plurality of predefined input signal property sets includes a phase of the beam of the acoustic signal.

Clause 43. The method of clause 38, wherein each of the plurality of predefined input signal property sets includes a magnitude of the beam of the acoustic signal.

Clause 44. The method of clause 38, wherein an acoustic transmitter includes multiple acoustic transmitting transceivers forming a phased array to transmit the acoustic signal to the passive acoustic metasurface according to a codeword of a transmission codebook to generate the predefined beam pattern towards the passive acoustic metasurface and the codeword corresponds to one of the predefined input signal property sets, wherein the transmission codebook of the phased array and the meta-atoms of the passive acoustic metasurface are tuned to realize a corresponding predefined output beam pattern.

Clause 45. The method of clause 38, wherein multiple acoustic receivers forming a phased array to receive the acoustic signal from the passive acoustic metasurface according to a codeword of a reception codebook to combine received signals at multiple receivers from the passive acoustic metasurface and the codeword corresponds to one of the predefined input signal property sets, wherein the reception codebook of the phased array and the meta-atoms of the passive acoustic metasurface are tuned to realize a corresponding predefined goal.

Clause 46. The method of clause 38, wherein an acoustic transmitter includes multiple acoustic transmitting transceivers and multiple acoustic receiving transceivers form another phased array configured to receive the acoustic signal from the passive acoustic metasurface, wherein the multiple acoustic transmitting transceivers use a codeword from a transmission codebook and the multiple acoustic receiving transceivers use a codeword from a reception codebook, and the transmission codebook, the reception codebook, and the passive acoustic metasurface are jointly tuned to realize a predefined goal.

Clause 47. A method of using a passive acoustic metasurface for interacting with an acoustic signal received at the passive acoustic metasurface, the method comprising: modifying at least one input property of the acoustic signal among a plurality of predefined input property sets, wherein the passive acoustic metasurface is formed as a matrix of meta-atoms distributed throughout the passive acoustic metasurface, each meta-atom being positioned in the passive acoustic metasurface to provide a tuned propagation profile of the meta-atoms in aggregate, each meta-atom providing a propagation path for at least a beam of the acoustic signal; and steering the acoustic signal exiting the passive acoustic metasurface each meta-atom modulating incoming acoustic wavefronts of the acoustic signal received by the meta-atom to form corresponding outgoing acoustic wavefronts of the acoustic signal exiting the passive acoustic metasurface, wherein the tuned propagation profile of the meta-atoms in aggregate supports the plurality of predefined input signal property sets of the incoming acoustic wavefronts and, for each input signal property set, physical dimensions and distribution of the meta-atoms in the passive acoustic metasurface are tuned according to the tuned propagation profile to phase shift the incoming acoustic wavefronts to generate a predefined beam pattern of the acoustic signal exiting the passive acoustic metasurface corresponding to the input signal property set.

Clause 48. The method of clause 47, wherein the tuned propagation profile of the meta-atoms in aggregate is based on a search for beamforming weights corresponding to different angles of arrival.

Clause 49. The method of clause 47, wherein the tuned propagation profile of the meta-atoms in aggregate is based on a search for a phase delay for each metasurface cells of the passive acoustic metasurface.

Clause 50. The method of clause 47, wherein each of the plurality of predefined input signal property sets includes an angle of incidence of the beam of the acoustic signal.

Clause 51. The method of clause 47, wherein each of the plurality of predefined input signal property sets includes a phase of the beam of the acoustic signal.

Clause 52. The method of clause 47, wherein each of the plurality of predefined input signal property sets includes a magnitude of the beam of the acoustic signal.

Clause 53. The method of clause 47, wherein an acoustic transmitter includes multiple acoustic transmitting transceivers forming a phased array to transmit the acoustic signal to the passive acoustic metasurface according to a codeword of a transmission codebook to generate the predefined beam pattern towards the passive acoustic metasurface and the codeword corresponds to one of the predefined input signal property sets, wherein the transmission codebook of the phased array and the meta-atoms of the passive acoustic metasurface are tuned to realize a corresponding predefined output beam pattern.

Clause 54. The method of clause 47, wherein multiple acoustic receivers forming a phased array to receive the acoustic signal from the passive acoustic metasurface according to a codeword of a reception codebook to combine received signals at multiple receivers from the passive acoustic metasurface and the codeword corresponds to one of the predefined input signal property sets, wherein the reception codebook of the phased array and the meta-atoms of the passive acoustic metasurface are tuned to realize a corresponding predefined goal.

Clause 55. The method of clause 47, wherein an acoustic transmitter includes multiple acoustic transmitting transceivers and multiple acoustic receiving transceivers form another phased array configured to receive the acoustic signal from the passive acoustic metasurface, wherein the multiple acoustic transmitting transceivers use a codeword from a transmission codebook and the multiple acoustic receiving transceivers use a codeword from a reception codebook, and the transmission codebook, the reception codebook, and the passive acoustic metasurface are jointly tuned to realize a predefined goal.

Clause 56. A system for designing a passive acoustic metasurface for interacting with an acoustic signal received at the passive acoustic metasurface from an acoustic transmitter, the method comprising: means for executing a search to tune physical dimensions and distribution of meta-atoms in the passive acoustic metasurface with respect to a plurality of predefined input signal property sets of the acoustic signal to provide a tuned propagation profile of the meta-atoms in aggregate; and means for forming the meta-atoms with the physical dimensions and the distribution determined by the search over the passive acoustic metasurface, wherein each meta-atom is configured to modulate incoming acoustic wavefronts to form corresponding outgoing acoustic wave exiting the passive acoustic metasurface, wherein the tuned propagation profile in aggregate supports the plurality of predefined input signal property sets of the incoming acoustic wavefronts and, for each input signal property set, the physical dimensions and the distribution of the meta-atoms are tuned according to the tuned propagation profile to modulate the incoming acoustic wavefronts to generate a predefined beam pattern of the acoustic signal exiting the passive acoustic metasurface corresponding to a select input signal property set of the plurality of predefined input signal property sets.

Clause 57. The system of any preceding clause, wherein each of the plurality of predefined input signal property sets includes an angle of incidence of an incoming beam of the acoustic signal.

Clause 58. The system of clause, wherein the acoustic transmitter includes multiple acoustic transmitters forming a phased array to transmit the acoustic signal to the passive acoustic metasurface according to a codeword of a transmission codebook to generate the predefined beam pattern towards the passive acoustic metasurface and the codeword corresponds to one of the predefined input signal property sets, wherein the transmission codebook of the phased array and the meta-atoms of the passive acoustic metasurface are tuned to realize a corresponding predefined output beam pattern.

Clause 59. The system of clause 3, wherein the search is configured to optimize a user-defined function or a function of signal-to-noise ratio (SNR) or sum capacity at a specified set of angles.

Clause 60. The system of any preceding clause, wherein multiple acoustic receivers forming a phased array to receive the acoustic signal from the passive acoustic metasurface according to a codeword of a reception codebook to combine received signals at multiple receivers from the passive acoustic metasurface and the codeword corresponds to one of the predefined input signal property sets, wherein the reception codebook of the phased array and the meta-atoms of the passive acoustic metasurface are tuned to realize a corresponding predefined goal.

Clause 61. The system of any preceding clause, wherein the search is configured to optimize a user-defined function or a function of signal-to-noise ratio (SNR) or sum capacity at a specified set of angles.

Clause 62. The system of any preceding clause, wherein the acoustic transmitter includes multiple acoustic transmitting transceivers and multiple acoustic receiving transceivers form another phased array configured to receive the acoustic signal from the passive acoustic metasurface, wherein the multiple acoustic transmitting transceivers use a codeword from a transmission codebook and the multiple acoustic receiving transceivers use a codeword from a reception codebook, and the transmission codebook, the reception codebook, and the passive acoustic metasurface are jointly tuned to realize a predefined goal.

Clause 63. The system of any preceding clause, wherein the search is configured to optimize a user-defined function or a function of signal-to-noise ratio (SNR) or sum capacity at a specified set of angles.

Clause 64. The system of any preceding clause, wherein the passive metasurface is designed for acoustic sensing including distance estimation or angle of arrival estimation or for acoustic communications.

Clause 65. A system for manufacturing a passive acoustic metasurface for interacting with an acoustic signal received at the passive acoustic metasurface, the method comprising: means for executing search to tune a beamforming weight and position of each meta-atom of a plurality of meta-atoms with respect to a steering vector corresponding to an incident angle of a beam of the acoustic signal; and means for forming a matrix of the meta-atoms distributed throughout the passive acoustic metasurface, each meta-atom being positioned in the passive acoustic metasurface to provide a tuned propagation profile of the meta-atoms in aggregate, each meta-atom providing a propagation path for at least a beam of the acoustic signal, each meta-atom interacting with the acoustic signal to modulate incoming acoustic wavefronts of the acoustic signal received by the meta-atom to form corresponding outgoing acoustic wavefronts of the acoustic signal exiting the passive acoustic metasurface, wherein the tuned propagation profile of the meta-atoms in aggregate supports a plurality of predefined input signal property sets of the incoming acoustic wavefronts and, for each input signal property set, physical dimensions and distribution of the meta-atoms in the passive acoustic metasurface are tuned according to the tuned propagation profile to phase shift the incoming acoustic wavefronts to generate a predefined beam pattern of the acoustic signal exiting the passive acoustic metasurface corresponding to the input signal property set.

Clause 66. The system of any preceding clause, wherein the tuned propagation profile of the meta-atoms in aggregate is based on a search for beamforming weights corresponding to different angles of arrival.

Clause 67. The system of any preceding clause, wherein the tuned propagation profile of the meta-atoms in aggregate is based on a search for a phase delay for each metasurface cells of the passive acoustic metasurface.

Clause 68. The system of any preceding clause, wherein each of the plurality of predefined input signal property sets includes an angle of incidence of the beam of the acoustic signal.

Clause 69. The system of any preceding clause, wherein each of the plurality of predefined input signal property sets includes a phase of the beam of the acoustic signal.

Clause 70. The system of any preceding clause, wherein each of the plurality of predefined input signal property sets includes a magnitude of the beam of the acoustic signal.

Clause 71. The system of any preceding clause, wherein an acoustic transmitter includes multiple acoustic transmitting transceivers forming a phased array to transmit the acoustic signal to the passive acoustic metasurface according to a codeword of a transmission codebook to generate the predefined beam pattern towards the passive acoustic metasurface and the codeword corresponds to one of the predefined input signal property sets, wherein the transmission codebook of the phased array and the meta-atoms of the passive acoustic metasurface are tuned to realize a corresponding predefined output beam pattern.

Clause 72. The system of any preceding clause, wherein multiple acoustic receivers forming a phased array to receive the acoustic signal from the passive acoustic metasurface according to a codeword of a reception codebook to combine received signals at multiple receivers from the passive acoustic metasurface and the codeword corresponds to one of the predefined input signal property sets, wherein the reception codebook of the phased array and the meta-atoms of the passive acoustic metasurface are tuned to realize a corresponding predefined goal.

Clause 73. The system of any preceding clause, wherein an acoustic transmitter includes multiple acoustic transmitting transceivers and multiple acoustic receiving transceivers form another phased array configured to receive the acoustic signal from the passive acoustic metasurface, wherein the multiple acoustic transmitting transceivers use a codeword from a transmission codebook and the multiple acoustic receiving transceivers use a codeword from a reception codebook, and the transmission codebook, the reception codebook, and the passive acoustic metasurface are jointly tuned to realize a predefined goal.

Clause 74. A system for using a passive acoustic metasurface for interacting with an acoustic signal received at the passive acoustic metasurface, the method comprising: means for modifying at least one input property of the acoustic signal among a plurality of predefined input property sets, wherein the passive acoustic metasurface is formed as a matrix of meta-atoms distributed throughout the passive acoustic metasurface, each meta-atom being positioned in the passive acoustic metasurface to provide a tuned propagation profile of the meta-atoms in aggregate, each meta-atom providing a propagation path for at least a beam of the acoustic signal; and means for steering the acoustic signal exiting the passive acoustic metasurface each meta-atom modulating incoming acoustic wavefronts of the acoustic signal received by the meta-atom to form corresponding outgoing acoustic wavefronts of the acoustic signal exiting the passive acoustic metasurface, wherein the tuned propagation profile of the meta-atoms in aggregate supports the plurality of predefined input signal property sets of the incoming acoustic wavefronts and, for each input signal property set, physical dimensions and distribution of the meta-atoms in the passive acoustic metasurface are tuned according to the tuned propagation profile to phase shift the incoming acoustic wavefronts to generate a predefined beam pattern of the acoustic signal exiting the passive acoustic metasurface corresponding to the input signal property set.

Clause 75. The system of any preceding clause, wherein the tuned propagation profile of the meta-atoms in aggregate is based on a search for beamforming weights corresponding to different angles of arrival.

Clause 76. The system of any preceding clause, wherein the tuned propagation profile of the meta-atoms in aggregate is based on a search for a phase delay for each metasurface cells of the passive acoustic metasurface.

Clause 77. The system of any preceding clause, wherein each of the plurality of predefined input signal property sets includes an angle of incidence of the beam of the acoustic signal.

Clause 78. The system of any preceding clause, wherein each of the plurality of predefined input signal property sets includes a phase of the beam of the acoustic signal.

Clause 79. The system of any preceding clause, wherein each of the plurality of predefined input signal property sets includes a magnitude of the beam of the acoustic signal.

Clause 80. The system of any preceding clause, wherein an acoustic transmitter includes multiple acoustic transmitting transceivers forming a phased array to transmit the acoustic signal to the passive acoustic metasurface according to a codeword of a transmission codebook to generate the predefined beam pattern towards the passive acoustic metasurface and the codeword corresponds to one of the predefined input signal property sets, wherein the transmission codebook of the phased array and the meta-atoms of the passive acoustic metasurface are tuned to realize a corresponding predefined output beam pattern.

Clause 81. The system of any preceding clause, wherein multiple acoustic receivers forming a phased array to receive the acoustic signal from the passive acoustic metasurface according to a codeword of a reception codebook to combine received signals at multiple receivers from the passive acoustic metasurface and the codeword corresponds to one of the predefined input signal property sets, wherein the reception codebook of the phased array and the meta-atoms of the passive acoustic metasurface are tuned to realize a corresponding predefined goal.

Clause 82. The system of any preceding clause, wherein an acoustic transmitter includes multiple acoustic transmitting transceivers and multiple acoustic receiving transceivers form another phased array configured to receive the acoustic signal from the passive acoustic metasurface, wherein the multiple acoustic transmitting transceivers use a codeword from a transmission codebook and the multiple acoustic receiving transceivers use a codeword from a reception codebook, and the transmission codebook, the reception codebook, and the passive acoustic metasurface are jointly tuned to realize a predefined goal.

Some implementations may comprise an article of manufacture, which excludes software per se. An article of manufacture may comprise a tangible storage medium to store logic and/or data. Examples of a storage medium may include one or more types of computer-readable storage media capable of storing electronic data, including volatile memory or nonvolatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described embodiments. The executable computer program instructions may include any suitable types of code, such as source code, compiled code, interpreted code, executable code, static code, dynamic code, and the like. The executable computer program instructions may be implemented according to a predefined computer language, manner, or syntax, for instructing a computer to perform a certain operation segment. The instructions may be implemented using any suitable high-level, low-level, object-oriented, visual, compiled, and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. A method of designing a passive acoustic metasurface for interacting with an acoustic signal received at the passive acoustic metasurface from an acoustic transmitter, the method comprising:

executing a search to tune physical dimensions and distribution of meta-atoms in the passive acoustic metasurface with respect to a plurality of predefined input signal property sets of the acoustic signal to provide a tuned propagation profile of the meta-atoms in aggregate; and forming the meta-atoms with the physical dimensions and the distribution determined by the search over the passive acoustic metasurface, wherein each meta-atom is configured to modulate incoming acoustic wavefronts to form corresponding outgoing acoustic wave exiting the passive acoustic metasurface, wherein the tuned propagation profile in aggregate supports the plurality of predefined input signal property sets of the incoming acoustic wavefronts and, for each input signal property set, the physical dimensions and the distribution of the meta-atoms are tuned according to the tuned propagation profile to modulate the incoming acoustic wavefronts to generate a predefined beam pattern of the acoustic signal exiting the passive acoustic metasurface corresponding to a select input signal property set of the plurality of predefined input signal property sets.

2. The method of claim 1, wherein each of the plurality of predefined input signal property sets includes an angle of incidence of an incoming beam of the acoustic signal.

3. The method of claim 1, wherein the acoustic transmitter includes multiple acoustic transmitters forming a phased array to transmit the acoustic signal to the passive acoustic metasurface according to a codeword of a transmission codebook to generate the predefined beam pattern towards the passive acoustic metasurface and the codeword corresponds to one of the predefined input signal property sets, wherein the transmission codebook of the phased array and the meta-atoms of the passive acoustic metasurface are tuned to realize a corresponding predefined output beam pattern.

4. The method of claim 1, wherein multiple acoustic receivers forming a phased array to receive the acoustic signal from the passive acoustic metasurface according to a codeword of a reception codebook to combine received signals at multiple receivers from the passive acoustic metasurface and the codeword corresponds to one of the predefined input signal property sets, wherein the reception codebook of the phased array and the meta-atoms of the passive acoustic metasurface are tuned to realize a corresponding predefined goal.

5. The method of claim 1, wherein the acoustic transmitter includes multiple acoustic transmitters to form a phased transmitter array, and multiple acoustic receivers to form a phased receiver array configured to receive the acoustic signal from the passive acoustic metasurface, wherein the multiple acoustic transmitters use a codeword from a transmission codebook and the multiple acoustic receivers use a codeword from a reception codebook, and the transmission codebook, the reception codebook, and the passive acoustic metasurface are jointly tuned to realize a predefined goal.

6. The method of claim 1, wherein the passive acoustic metasurface is designed for acoustic sensing including distance estimation or angle of arrival estimation or for acoustic communications.

7. A passive acoustic metasurface system for interacting with an acoustic signal received at the passive acoustic metasurface system from an acoustic transmitter, the passive acoustic metasurface system comprising:

a passive acoustic metasurface designed by executing a search to tune physical dimensions and distribution of meta-atoms in the passive acoustic metasurface with respect to a plurality of predefined input signal property sets of the acoustic signal to provide a tuned propagation profile of the meta-atoms in aggregate, and manufactured by forming the meta-atoms with the physical dimensions and the distribution determined by the search over the passive acoustic metasurface, wherein each meta-atom is configured to modulate incoming acoustic wavefronts to form corresponding outgoing acoustic wave exiting the passive acoustic metasurface, wherein the tuned propagation profile in aggregate supports the plurality of predefined input signal property sets of the incoming acoustic wavefronts and, for each input signal property set, the physical dimensions and the distribution of the meta-atoms are tuned according to the tuned propagation profile to modulate the incoming acoustic wavefronts to generate a predefined beam pattern of the acoustic signal exiting the passive acoustic metasurface corresponding to a select input signal property set plurality of predefined input signal property sets.

8. The passive acoustic metasurface system of claim 7, wherein each of the plurality of predefined input signal property sets includes an angle of incidence of an incoming beam of the acoustic signal.

9. The passive acoustic metasurface system of claim 7, wherein the acoustic transmitter includes multiple acoustic transmitters forming a phased array to transmit the acoustic signal to the passive acoustic metasurface according to a codeword of a transmission codebook to generate the predefined beam pattern towards the passive acoustic metasurface and the codeword corresponds to one of the predefined input signal property sets, wherein the transmission codebook of the phased array and the meta-atoms of the passive acoustic metasurface are tuned to realize a corresponding predefined output beam pattern.

10. The passive acoustic metasurface system of claim 7, wherein multiple acoustic receivers forming a phased array to receive the acoustic signal from the passive acoustic metasurface according to a codeword of a reception codebook to combine received signals at multiple receivers from the passive acoustic metasurface and the codeword corresponds to one of the predefined input signal property sets, wherein the reception codebook of the phased array and the meta-atoms of the passive acoustic metasurface are tuned to realize a corresponding predefined goal.

11. The passive acoustic metasurface system of claim 7, wherein the acoustic transmitter includes multiple acoustic transmitting transceivers and multiple acoustic receiving transceivers form another phased array configured to receive the acoustic signal from the passive acoustic metasurface, wherein the multiple acoustic transmitting transceivers use a codeword from a transmission codebook and the multiple acoustic receiving transceivers use a codeword from a reception codebook, and the transmission codebook, the reception codebook, and the passive acoustic metasurface are jointly tuned to realize a predefined goal.

12. A passive acoustic metasurface for interacting with an acoustic signal received at the passive acoustic metasurface, the passive acoustic metasurface comprising:

a matrix of meta-atoms distributed throughout the passive acoustic metasurface, each meta-atom being positioned in the passive acoustic metasurface to provide a tuned propagation profile of the meta-atoms in aggregate, each meta-atom providing a propagation path for at least a beam of the acoustic signal, each meta-atom interacting with the acoustic signal to modulate incoming acoustic wavefronts of the acoustic signal received by the meta-atom to form corresponding outgoing acoustic wavefronts of the acoustic signal exiting the passive acoustic metasurface, wherein the tuned propagation profile of the meta-atoms in aggregate supports a plurality of predefined input signal property sets of the incoming acoustic wavefronts and, for each input signal property set, physical dimensions and distribution of the meta-atoms in the passive acoustic metasurface are tuned according to the tuned propagation profile to phase shift the incoming acoustic wavefronts to generate a predefined beam pattern of the acoustic signal exiting the passive acoustic metasurface corresponding to the input signal property set.

13. The passive acoustic metasurface of claim 12, wherein the tuned propagation profile of the meta-atoms in aggregate is based on a search for beamforming weights corresponding to different angles of arrival.

14. The passive acoustic metasurface of claim 12, wherein the tuned propagation profile of the meta-atoms in aggregate is based on a search for a phase delay for each metasurface cells of the passive acoustic metasurface.

15. The passive acoustic metasurface of claim 12, wherein each of the plurality of predefined input signal property sets includes an angle of incidence of the beam of the acoustic signal.

16. The passive acoustic metasurface of claim 12, wherein each of the plurality of predefined input signal property sets includes a phase of the beam of the acoustic signal.

17. The passive acoustic metasurface of claim 12, wherein each of the plurality of predefined input signal property sets includes a magnitude of the beam of the acoustic signal.

18. The passive acoustic metasurface of claim 12, wherein an acoustic transmitter includes multiple acoustic transmitting transceivers forming a phased array to transmit the acoustic signal to the passive acoustic metasurface according to a codeword of a transmission codebook to generate the predefined beam pattern towards the passive acoustic metasurface and the codeword corresponds to one of the predefined input signal property sets, wherein the transmission codebook of the phased array and the meta-atoms of the passive acoustic metasurface are tuned to realize a corresponding predefined output beam pattern.

19. The passive acoustic metasurface of claim 12, wherein multiple acoustic receivers forming a phased array to receive the acoustic signal from the passive acoustic metasurface according to a codeword of a reception codebook to combine received signals at multiple receivers from the passive acoustic metasurface and the codeword corresponds to one of the predefined input signal property sets, wherein the reception codebook of the phased array and the meta-atoms of the passive acoustic metasurface are tuned to realize a corresponding predefined goal.

20. The passive acoustic metasurface of claim 12, wherein an acoustic transmitter includes multiple acoustic transmitting transceivers and multiple acoustic receiving transceivers form another phased array configured to receive the acoustic signal from the passive acoustic metasurface, wherein the multiple acoustic transmitting transceivers use a codeword from a transmission codebook and the multiple acoustic receiving transceivers use a codeword from a reception codebook, and the transmission codebook, the reception codebook, and the passive acoustic metasurface are jointly tuned to realize a predefined goal.

* * * * *